US011945227B2

(12) United States Patent
Hatta et al.

(10) Patent No.: US 11,945,227 B2
(45) Date of Patent: Apr. 2, 2024

(54) HEAD ASSEMBLY AND PRINTING APPARATUS INCLUDING HEAD ASSEMBLY

(71) Applicant: BROTHER KOGYO KABUSHIKI KAISHA, Nagoya (JP)

(72) Inventors: Fumika Hatta, Kuwana (JP); Hirotoshi Ishizaki, Nagakute (JP)

(73) Assignee: BROTHER KOGYO KABUSHIKI KAISHA, Nagoya (JP)

( * ) Notice: Subject to any disclaimer, the term of this patent is extended or adjusted under 35 U.S.C. 154(b) by 0 days.

(21) Appl. No.: 17/704,749

(22) Filed: Mar. 25, 2022

(65) Prior Publication Data

US 2022/0314628 A1 Oct. 6, 2022

(30) Foreign Application Priority Data

Mar. 30, 2021 (JP) ................................ 2021-057463

(51) Int. Cl.
*B41J 2/045* (2006.01)
*B41J 2/145* (2006.01)
*B41J 2/17* (2006.01)
*B41J 2/175* (2006.01)

(52) U.S. Cl.
CPC ............... *B41J 2/175* (2013.01); *B41J 2/145* (2013.01); *B41J 2/1707* (2013.01)

(58) Field of Classification Search
CPC ...... B41J 2/0454; B41J 2/04563; B41J 2/175; B41J 2/145
See application file for complete search history.

(56) References Cited

U.S. PATENT DOCUMENTS

2015/0077473 A1* 3/2015 Wanibe .................... B41J 2/175 347/50
2018/0215167 A1* 8/2018 Brandenberger .... B41J 2/04541

FOREIGN PATENT DOCUMENTS

EP 3162572 A1 5/2017
EP 3461641 A1 4/2019
JP 2007-90693 A 4/2007
JP 2011-201231 A 10/2011

OTHER PUBLICATIONS

Extended European Search Report issued in corresponding European Patent Application No. 22164493.3, dated Aug. 19, 2022.
Office Action in corresponding European Patent Application No. 22164493.3, dated Feb. 9, 2024.

* cited by examiner

*Primary Examiner* — Jason S Uhlenhake
(74) *Attorney, Agent, or Firm* — Merchant & Gould P.C.

(57) ABSTRACT

There is provided a head assembly including: a rigid substrate; a plurality of heads; a tank; a plurality of tubes; a heater; a plurality of flexible substrates; a relay substrate; a first member; and a second member arranged on one side in a first direction with respect to the first space. The rigid substrate is arranged in a first space formed in the first member. The tank, the heater, the plurality of tubes and the plurality of flexible substrates are arranged in a second space formed in the second member. The relay substrate is located between the first space and the second space in a first direction, and partitions the first space and the second space from each other.

18 Claims, 17 Drawing Sheets

CROSS SECTION A

CROSS SECTION C

CROSS SECTION B

CROSS SECTION D

HEAD ASSEMBLY AND PRINTING APPARATUS INCLUDING HEAD ASSEMBLY

CROSS REFERENCE TO RELATED APPLICATION

The present application claims priority from Japanese Patent Application No. 2021-057463, filed on Mar. 30, 2021, the disclosure of which is incorporated herein by reference in its entirety.

BACKGROUND

The present disclosure relates to a head assembly having a plurality of heads, and a printing apparatus provided with the same.

A certain publicly known printing apparatus is provided with a plurality of head units which are aligned along a conveying direction of a sheet (paper sheet). Each of the head units is provided with a casing, a plurality of heads, a liquid supplying device configured to supply a UV ink containing an infrared curing agent to the plurality of heads, and a control substrate. The plurality of heads, the liquid supplying device and the control substrate of each of the plurality of head units are arranged in the inside of the casing.

SUMMARY

The viscosity of the UV ink greatly varies or changes depending on a change in the temperature. Accordingly, from the viewpoint of avoiding the occurrence of any unsatisfactory discharge or ejection in the head(s), it is desired to make the temperature of a space around the heads and the liquid supplying device to be constant so as to maintain the temperature of the UV ink at a constant temperature. In view of this, since the control substrate generates a heat accompanying with the driving of the head(s), the control substrate needs to be cooled by using a fan, etc. In the above-described printing apparatus, the liquid supplying device and the heads each including the UV ink which needs to be maintained at the constant temperature and the control substrate requiring the cooling are arranged in the same casing. Therefore, there is such a fear that the temperature of the space around the heads and the liquid supplying device might vary or fluctuate accompanying with the cooling of the control substrate. In a case that the temperature of the space around the heads and the liquid supplying device varies, there is such a fear that the temperature of the UV ink might vary and a discharge state (ejection state) of the head(s) might vary.

An object of the present disclosure is to provide a technique of suppressing any variation or fluctuation in the temperature of the ink due to the cooling of the control substrate.

According to an aspect of the present disclosure, there is provided a head assembly including: a rigid substrate; a plurality of heads; a tank; a plurality of tubes; a heater; a plurality of flexible substrates; a relay substrate; a first member; and a second member. The rigid substrate includes a connector and on which a power source is mounted. The tank is configured to store an ink which is to be supplied to the plurality of heads. Each of the plurality of tubes connects the tank and one of the plurality of heads. The heater is configured to warm the ink in the tank and in the plurality of tubes. Each of the plurality of flexible substrates includes an end electrically connected to one of the plurality of heads.

The other end of each of the plurality of flexible substrates and the connector of the rigid substrate are electrically connected to the relay substrate. The first member is configured to define a first space and includes an airflow port configured to take an outside air thereinto. The second member is configured to define a second space which is arranged on one side in a first direction with respect to the first space. The rigid substrate is arranged in the first space. The tank, the heater, the plurality of tubes and the plurality of flexible substrates are arranged in the second space. The relay substrate is arranged between the first space and the second space in the first direction, and partitions the first space and the second space from each other.

In the above-described configuration, the rigid substrate having the power source mounted thereon is arranged in the first space defined by the first member; and the tank configured to store the ink, the plurality of tubes forming an ink channel, the heater configured to warm or heat the ink, and the plurality of flexible substrates are arranged in the second space defined by the second member. The first space and the second space are partitioned from each other by the relay substrate. Since the airflow port configured to take the outside air thereinto is formed in the first member, it is possible to cool the power source of the rigid substrate by taking the outside air thereinto. The first space and the second space, however, are partitioned from each other by the relay substrate, thereby making it possible to suppress any variation or fluctuation in the temperature in the second space which would be otherwise caused due to any inflow of the air of the first space into the second space. With this, it is possible to suppress any effect of the variation in the temperature in the first space to the temperature in the second space, while cooling the first space with the outside air. Further, it is possible to electrically connect, to the relay substrate, the other end of each of the plurality of flexible substrates and the connector of the rigid substrate. With this, it is possible to connect the first space and the second space electrically, while shutting off the first space and the second space from each other thermally.

DETAILED DESCRIPTION

Figure 1:
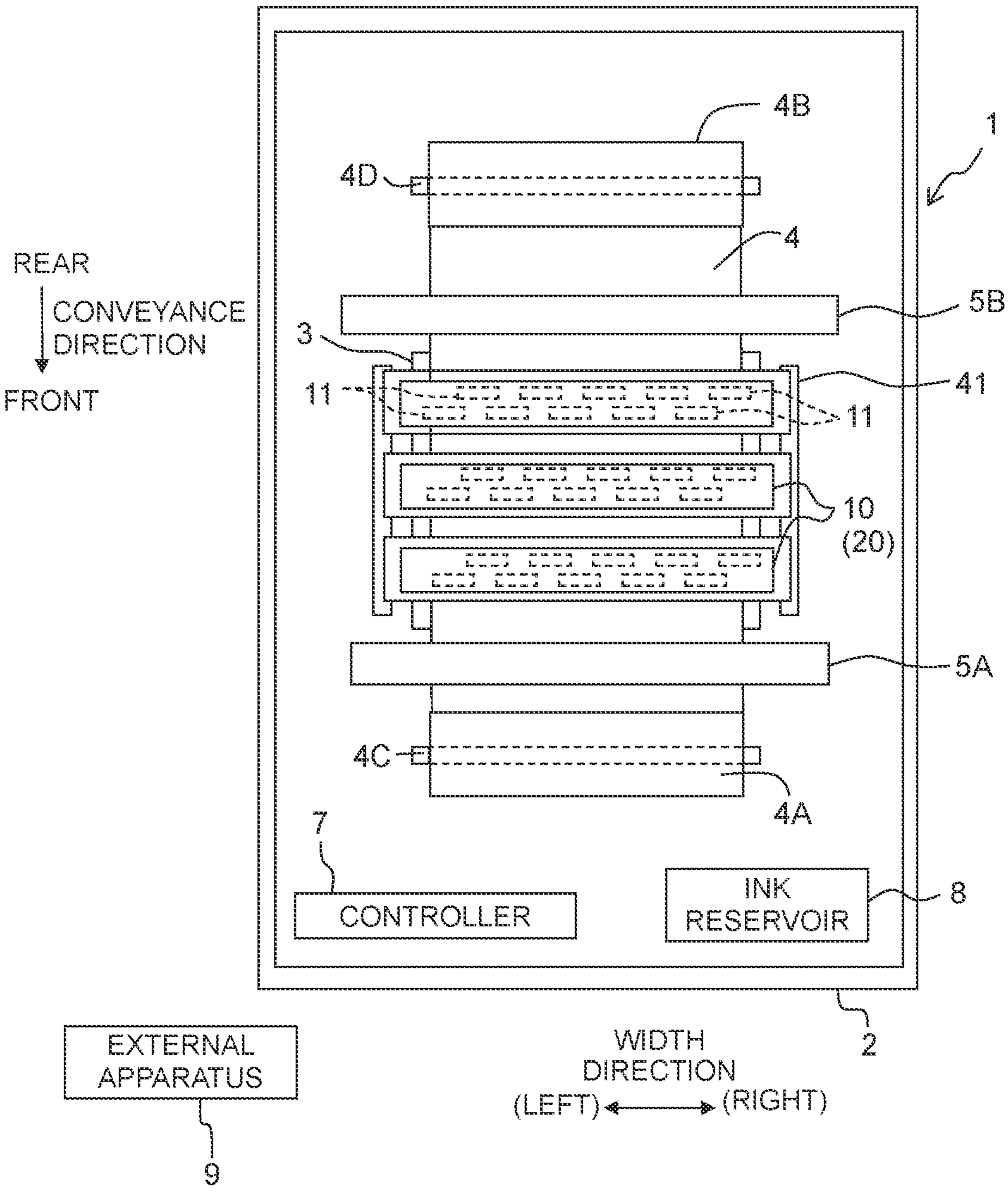
FIG. 1 is a schematic plan view of a printing apparatus 1.

In the following, a printing apparatus 1 according to an embodiment of the present disclosure will be explained, based on the drawings. In FIG. 1, a conveying direction of a recording medium 4 corresponds to a front-rear direction of the printing apparatus 1. Further, a width direction of the recording medium 4 corresponds to a left-right direction of the printing apparatus 1. Furthermore, a direction orthogonal to the front-rear direction and the left-right direction, namely, a direction perpendicular to the sheet surface in FIG. 1 corresponds to an up-down direction of the printing apparatus 1. Note that the left-right direction is an example of a "first direction" of the present embodiment, and the front-rear direction (conveying direction) is an example of a "second direction" of the present embodiment.

Figure 2:
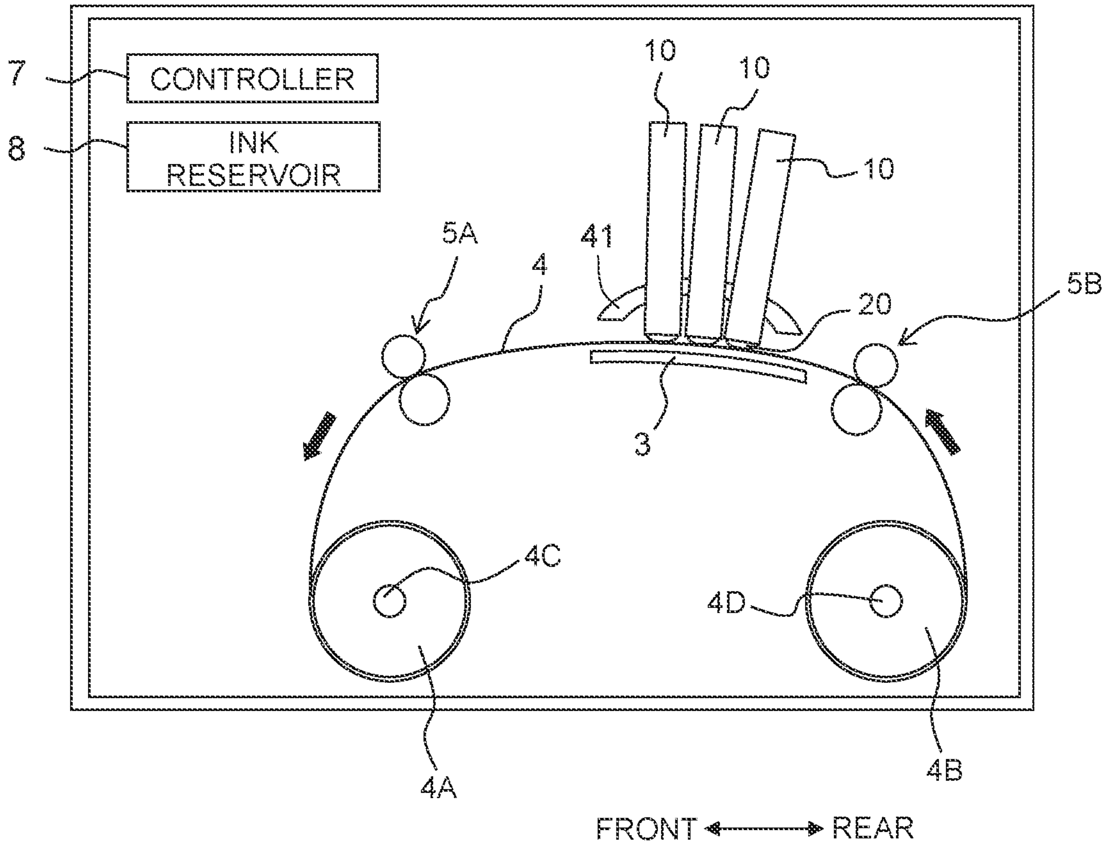
FIG. 2 is a schematic view of the printing apparatus 1.

As depicted in FIGS. 1 and 2, the printing apparatus 1 is provided with a platen 3, three line head assemblies 10 (an example of a "head assembly" of the present disclosure), two conveying rollers 5A and 5B, a controller 7, five ink reservoirs 8, etc., which are accommodated in a casing 2. Note that in FIGS. 1 and 2, only one reservoir 8 is depicted so as to simplify the drawings.

As depicted in FIGS. 1 and 2, a recording medium 4 is placed on an upper surface of the platen 3. The three line head assemblies 10 are arranged, at a location above the platen 3, so as to face (to be opposite to) the platen 3. An ink is supplied from the ink reservoir 8 to each of the line head assemblies 10. The structure of each of the line head assemblies 10 will be explained later on. Note that the three line head assemblies 10 are fixed to an arch frame 41 so that the three line head assemblies 10 are arranged along the front-rear direction (the conveying direction of the recording medium 4). As depicted in FIG. 2, the arch frame 41 has an arch shape, and the three line head assemblies 10 are arranged so that the three line head assemblies 10 are inclined with respect to a horizontal plane at mutually different angles.

As depicted in FIGS. 1 and 2, the two conveying rollers 5A and 5B are arranged, respectively, on the rear side and the front side of the platen 3. The two conveying rollers 5A and 5B are driven by a non-illustrated motor. As depicted in FIG. 2, the recording medium 4 is fed from a feeding roll 4A around which the recording medium 4 is wound in a roll shape, and is wound by a winding roll 4B. For example, it is allowable to use roll paper (roll paper sheet) as the recording medium 4. Rotating shafts 4C and 4D, which are rotated by a non-illustrated motor, are attached to the feeding roll 4A and the winding roll 4B, respectively. These two rotating shafts 4C and 4D and the two conveying rollers 5A and 5B cooperate so as to feed the recording medium 4 from the feeding roll 4A, to convey the recording medium 4 toward the downstream side in the conveying direction (frontward) so that the recording medium 4 passes on the platen 3, and to cause the recording medium 4 to be wound by the winding roll 4B. The two rotating shafts 4C and 4D and the two conveying rollers 5A and 5B are an example of a "conveyor" of the present disclosure.

Figure 3:
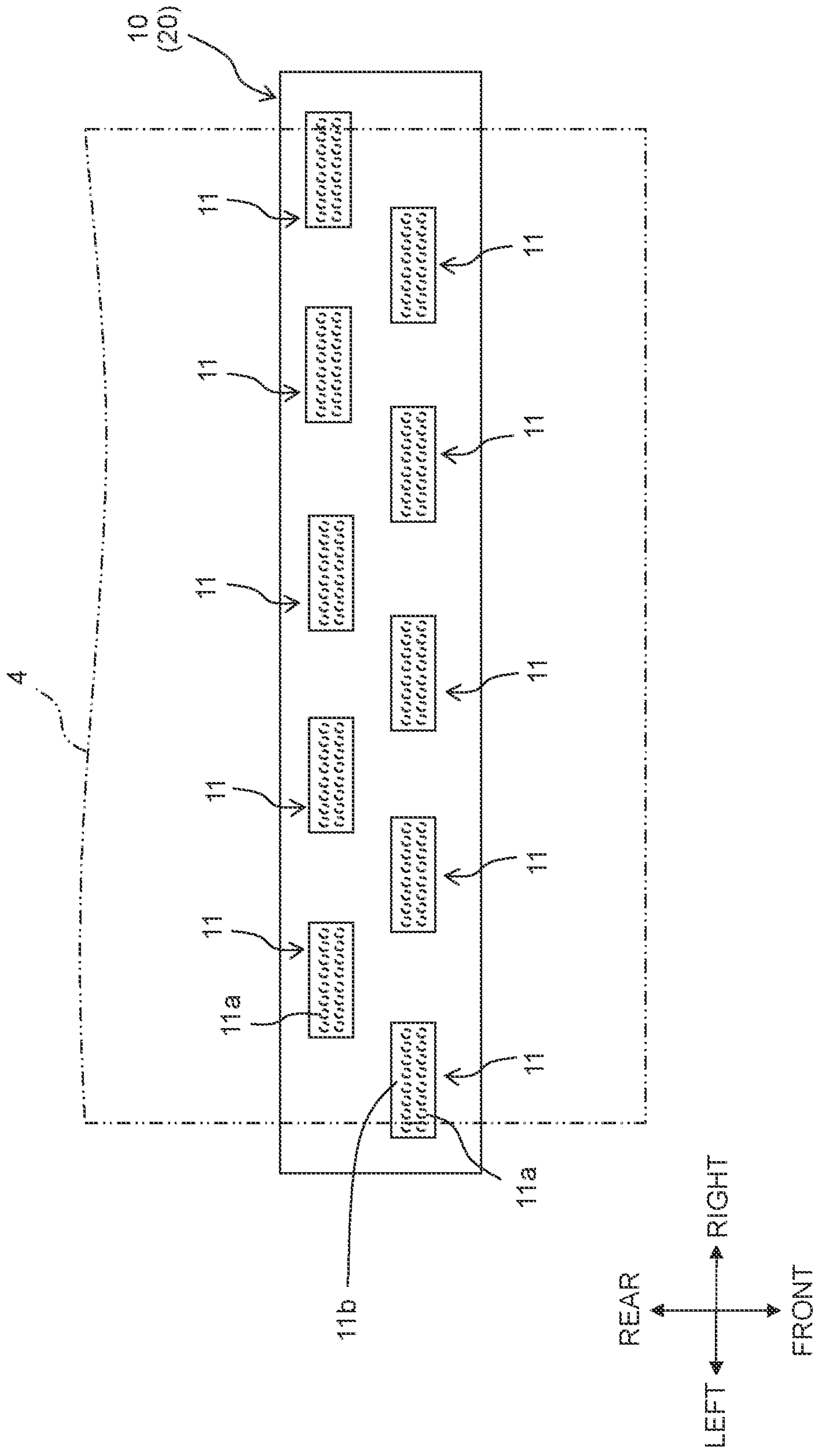
FIG. 3 is a schematic view for explaining arrangement of heads included in a line head 20.

As depicted in FIG. 3, each of the line head assemblies 10 is provided with a line head 20 having a plurality of heads 11 (10 pieces of the head 11 in the present embodiment). The plurality of heads 11 construct two head rows (head arrays) which are arranged in the front-rear direction. Each of the head rows includes 5 pieces of the head 11 which are arranged in the left-right direction. Positions in the front-rear direction of the five heads 11 arranged in the left-right direction are same. Note that, however, in the following explanation, the phrase that "the positions are same" does not mean that the positions are same in a strict sense; rather, the phrase intends to mean that the positions are same within a manufacturing error and an attaching error. Note that the positions in the left-right direction of the heads 11 included in the two head rows are shifted from one another. Namely, 10 pieces of the head 11 are arranged in a staggered manner.

A lower surface 11*b* of each of the heads 11 is a nozzle surface in which a plurality of nozzles 11*a* are formed. As depicted in FIG. 3, the plurality of nozzles 11*a* of each of the heads 11 are arranged in a row form along the left-right direction which is the longitudinal direction of the line head 20 (line head assembly 10) to thereby construct two nozzle rows. Note that although an intra-head channel is formed in the inside of each of the heads 11, the shape, etc., of the intra-head channel will be described later on.

As described above, the ten heads 11 in each of the line head assemblies 10 (line heads 20) form the two head rows. As described above, each of the ten heads 11 has the two nozzle rows. Since it is possible to discharge or eject different color inks from the respective nozzle rows, each of the ten heads 11 is capable of ejecting two color inks, at most. A white ink is supplied from one of the five ink reservoirs 8 to ten heads 11 of a line head assembly 10 which is arranged on the rearmost side (arranged closest to the upstream side in the conveying direction) among the three line head assemblies 10. The white ink is usable for under-layer printing. A yellow ink and a magenta ink are supplied, respectively, from two of the five ink reservoirs 8 to ten heads 11 of a line head assembly 10 which is arranged second from the rear side (second from the upstream side in the conveying direction) among the three line head assemblies 10. The yellow ink is ejected from a nozzle row which is arranged on the rear side (the upstream side in the conveying direction) among the two nozzle rows; and the magenta ink is ejected from a nozzle row which is arranged on the front side (the downstream side in the conveying direction) among the two nozzle rows, of each of the heads 11. A cyan ink and a black ink are supplied, respectively, from two of the five ink reservoirs 8 to ten heads 11 of a line head assembly 10 which is arranged on the frontmost side (arranged closest to the downstream side in the conveying direction) among the three line head assemblies 10. The cyan ink is ejected from a nozzle row which is arranged on the rear side (the upstream side in the conveying direction) among the two nozzle rows; and the black ink is ejected from a nozzle row which is arranged on the front side (the downstream side in the conveying direction) among the two nozzle rows, of each of the heads 11. In the present embodiment, the inks are ejected from the three line head assemblies 10 which are arranged in the conveying direction in an order of a light (pale) color ink to a deep color ink from the upstream side toward the downstream side in the conveying direction, as described above. Note that in the present embodiment, each of the white ink, the yellow ink, the magenta ink, the cyan ink and the black ink is an UV-curable ink. The viscosity of the UV-curable ink varies or changes greatly depending on the temperature. In order to avoid any unsatisfactory ejection, it is necessary to maintain the viscosity of the ink within an appropriate range. For this purpose, it is necessary to maintain the temperature of the UV-curable ink at an appropriate temperature.

The controller 7 is provided with a FPGA (Field Programmable Gate Array), an EEPROM (Electrically Erasable Programmable Read-Only Memory), a RAM (Random Access Memory), etc. Note that the controller 7 may be provided with a CPU (Central Processing Unit) or an ASIC (Application Specific Integrated Circuit), etc. The controller 7 is connected to an external apparatus 9 such as a PC, etc., to be capable of data communication, and controls the respective parts or components of the printing apparatus 1 based on print data transmitted from the external apparatus 9.

The controller 7 controls the motor driving the rotating shafts 4C and 4D and the motor driving the conveying rollers 5A and 5B so as to causes the two conveying rollers 5A and 5B to convey the recording medium 4 in the conveying direction. Further, the controller 7 controls the three line head assemblies 10 so as to eject the ink(s) from the nozzles 11*a* toward the recording medium 4. With this, an image is printed on the recording medium 4.

<Configuration of Line Head Assembly 10>

Figure 5:
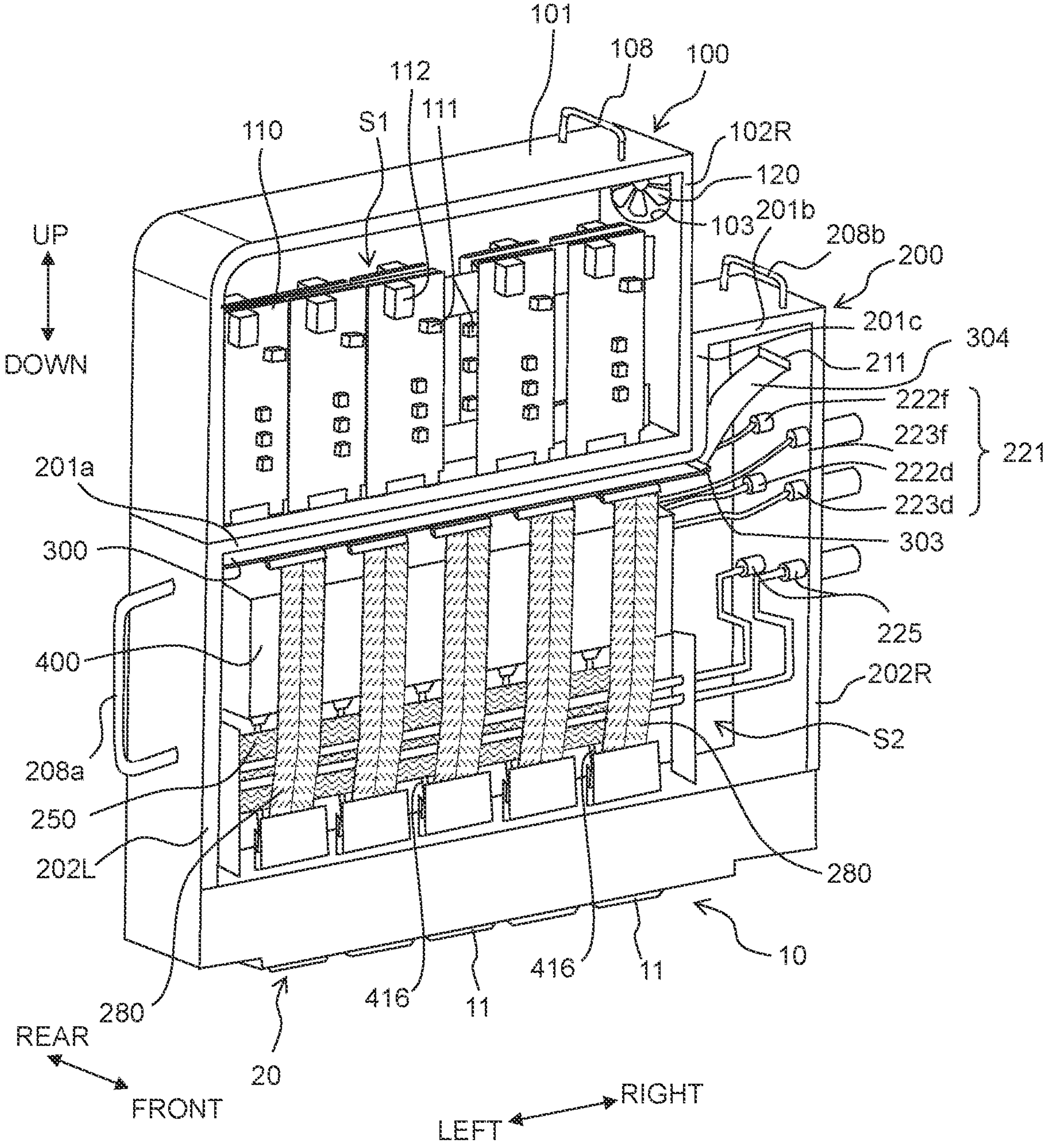
FIG. 5 is a schematic view explaining a line head assembly 10.

Next, the structure of the line head assembly 10 will be explained, with reference to the drawings. Note that since the three line head assemblies 10 has a same structure, the explanation will be made regarding one of the line head assemblies 10. As described above, the three line head assemblies 10 are arranged so as to be inclined with respect to the horizontal plane at the mutually different angles, respectively. However, in order to simplify the explanation, in the following description, the direction(s) is (are) defined on the premise that the line head assemblies 10 are arranged perpendicularly on the horizontal plane. As depicted in FIG. 5, each of the line head assemblies 10 is mainly provided with: a first casing 100, a second casing 200, a line head 20 including ten heads 11, ten rigid substrates 110, ten flexible substrates 280, a fan 120, a relay substrate 300, a tank 400, a heater 250, and a plurality of tubes 416 connecting the heads 11 with the tank 400. Note that in FIG. 5, five flexible substrates 280 among the ten flexible substrates 280 are depicted.

<First Casing 100 and Second Casing 200>

Figure 4:
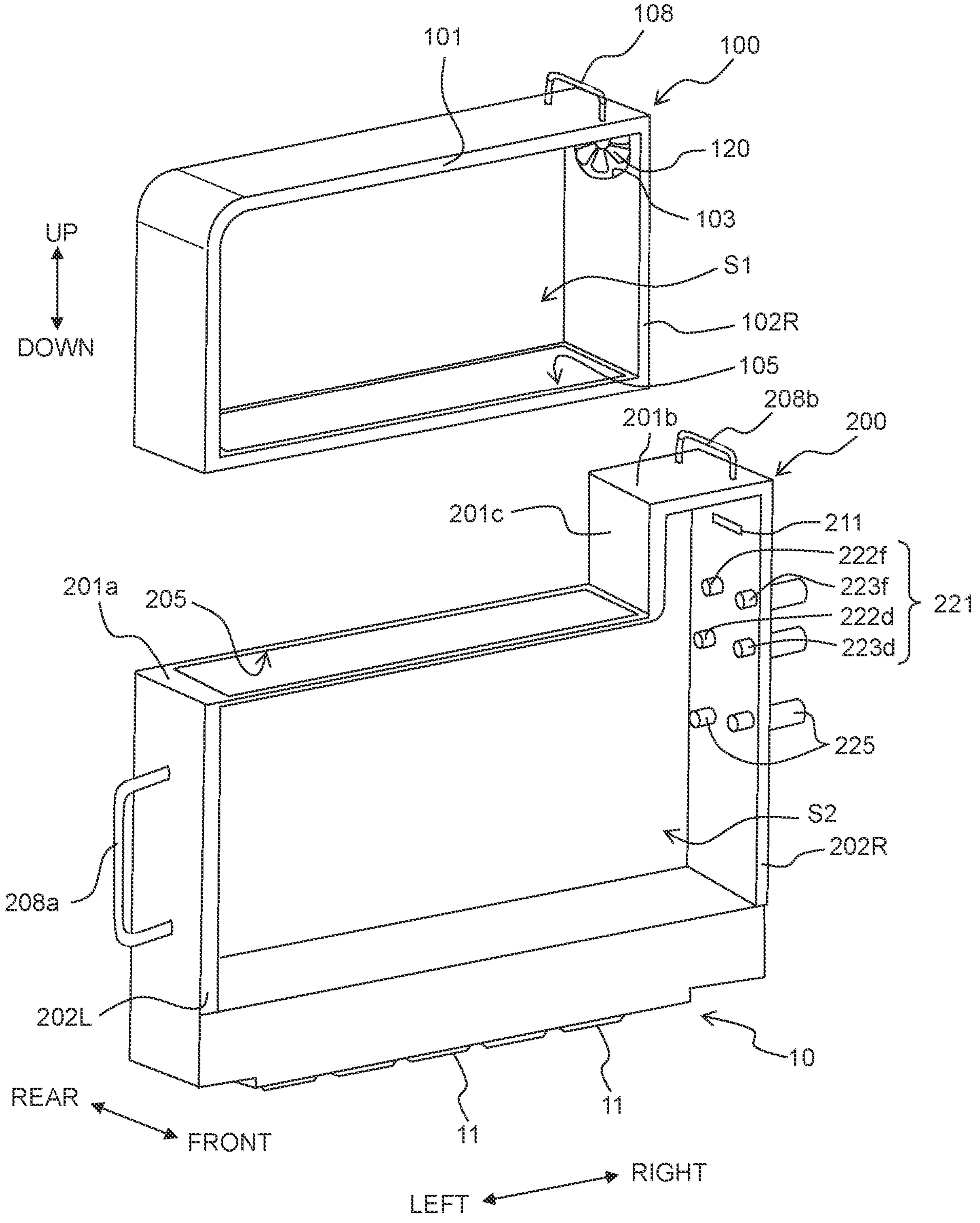
FIG. 4 is a perspective view of a first casing 100 and a second casing 200.

As depicted in FIGS. 4 and 5, the first casing 100 is arranged to be superposed above the second casing 200. The first casing 100 defines, in the inside thereof, a first space S1, and the second casing 200 defines, in the inside thereof, a second space S2. Note that in FIGS. 4 and 5, a lateral surface on the front side and a lateral surface on the rear side of each of the first casing 100 and the second casing 200 are removed so that the first space S1 and the second spaced S2 are easily seen. Note that the left-right direction corresponds to a depth direction of the first casing 100 and the second casing 200, and the front-rear direction corresponds to a width direction of the first casing 100 and the second casing 200. The depth direction is orthogonal to both of the up-down direction and the width direction.

As depicted in FIG. 4, the first casing 100 has a substantially rectangular parallelepiped shape. A top plate 101 defining the upper surface of the first casing 100 is provided with a first grip 108. A airflow port 103 is opened in a side wall 102R on the right side of the first casing 100. The fan 120 is attached to the airflow port 103. As will be described later on, the fan 102 is capable of feeding airflow (air) in an aligning direction (the left-right direction, the depth direction) of the rigid substrates 110. Further, an opening 105 is formed in the lower surface of the first casing 100.

The second casing 200 has such a shape that two rectangular parallelepipeds of which heights are mutually different are combined, and has, for example, a substantially shape of a letter "L" as seen from the front-rear direction. The upper surface of the second casing 200 has a first top plate 201*a*, a second top plate 201*b* which is arranged on the right side and on the upper side of the first top plate 201*a*, and a connecting wall 201*c* which links the first top plate 201*a* and the second top plate 201*b* and extends in the up-down direction. The connecting wall 201*c* expands in the width direction (front-rear direction) and the up-down direction, and is orthogonal to the depth direction (left-right direction). An opening 205 is formed in the first top plate 201*a*. Note that an opening area of the opening 105 formed in the lower surface of the first casing 100 and an opening area of the opening 205 formed in the first top plate 201*a* of the second casing 200 are approximately same. In a case that the first casing 100 is arranged to be overlaid on the upper surface of the second casing (the first top plate 201*a*) from thereabove, the two openings 105 and 205 overlap with each other in the up-down direction.

A second grip 208*a* is provided on a side wall 202L on the left side of the second casing 200, and a third grip 208*b* is provided on the second top plate 201*b* of the second casing 200. An electric power input port 211, four ink ports 221 and a set of cooling water ports 225 are provided on a side wall 202R on the right side of the second casing 200. The set of cooling water ports 225 are each a port for circulating a cooling water for colling the heads 11. A non-illustrated piezoelectric actuator provided in the inside of each of the heads 11 generates heat accompanying with being driven. Accordingly, in a case that the head 11 is not sufficiently cooled, any unevenness in the temperature occurs in the head 11, due to which any difference in the viscosity occurs, in some cases, between a certain nozzle 11*a* and another nozzle 11*a*. In such a case, even in a case that a driving signal of a same waveform is inputted, there is such a fear that any difference in the size might arise between an ink droplet of the ink ejected from the certain nozzle 11*a* and an ink droplet of the ink ejected from the another nozzle 11*a*, in some cases, and which might lead to any lowering in the print quality. In view of this, in the present embodiment, the cooling water is introduced from the set of cooling water ports 225 so as to cool the heads 11. A non-illustrated electric power cable from a non-illustrated external power source is connected to the electric power input port 211. The four ink ports 221 has a first ink supply port 222*f*, a second ink supply port 223*f*, a first ink discharge port 222*d*, and a second ink discharge port 223*d*. The first ink supply port 222*f* and the first ink discharge port 222*d* construct a pair, and are connected to a same ink reservoir 8 (see FIG. 14). Namely, a same ink flows in the pair of the first ink supply port 222*f* and the first ink discharge port 222*d*. The first ink supply port 222*f* and the first ink discharge port 222*d* are connected, respectively, to a first supply port 458 and a first discharge port 468 of the tank 400 (see FIG. 9). The second ink supply port 223*f* and the second ink discharge port 223*d* construct another pair, and are connected to a same ink reservoir 8 (see FIG. 15). Namely, a same ink flows in the pair of the second ink supply port 223*f* and the second ink discharge port 223*d*. Note that it is not necessarily indispensable that the ink flowing in the pair of the first ink supply port 222*f* and the first ink discharge port 222*d* and the ink flowing in the pair of the second ink supply port 223*f* and the second ink discharge port 223*d* are same; for example, the inks may be different from each other. Further, the second ink supply port **223*f* and the second ink discharge port 223*d* are connected, respectively, to a second supply port 478 and a second discharge port 488 of the tank 400 (see FIG. 9**).

As depicted in FIGS. 4 and 5, since the four ink ports 221 are arranged on the lower side of the power source input port 211, in a case that the ink leaks from the ink port(s) 211 and drips downward, there is no such a fear that the ink might adhere to the electric power input port 211. With this, it is possible to prevent any shortage which would be otherwise caused by any dirtying of and the adhesion of the ink to the electric power input port 211.

As depicted in FIG. 5, the relay substrate 300 is attached to the second casing 200 so as to close the opening 205, formed in the first top plate **201*a* of the second casing 200, from therebelow. An upper surface of the relay substrate 300 is exposed from the opening 105 of the first casing 100, and the upper surface of the relay substrate 300 closes the opening of the first casing 100. Namely, the relay substrate 300 closes both of the opening 105 in the lower surface of the first casing 100 and the opening 205 in the upper surface of the second casing 200. With this, the upper surface of the relay substrate 300 defines a part of the first space S1 and the lower surface of the relay substrate 300 defines a part of the second space S2**.

<Relay Substrate 300>

Figure 6A:
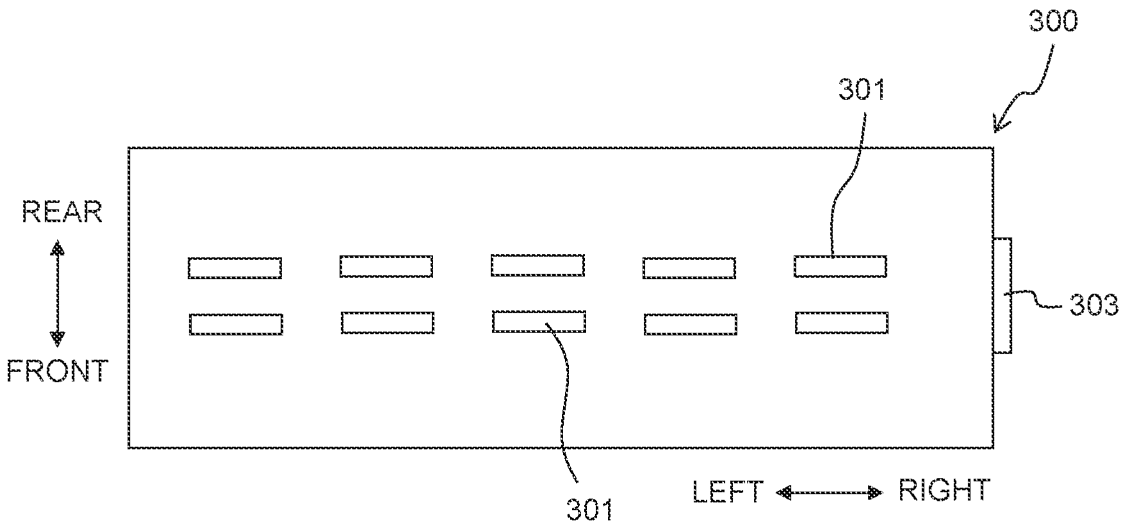
FIG. 6A is a top view of a relay substrate 300.
Figure 6B:
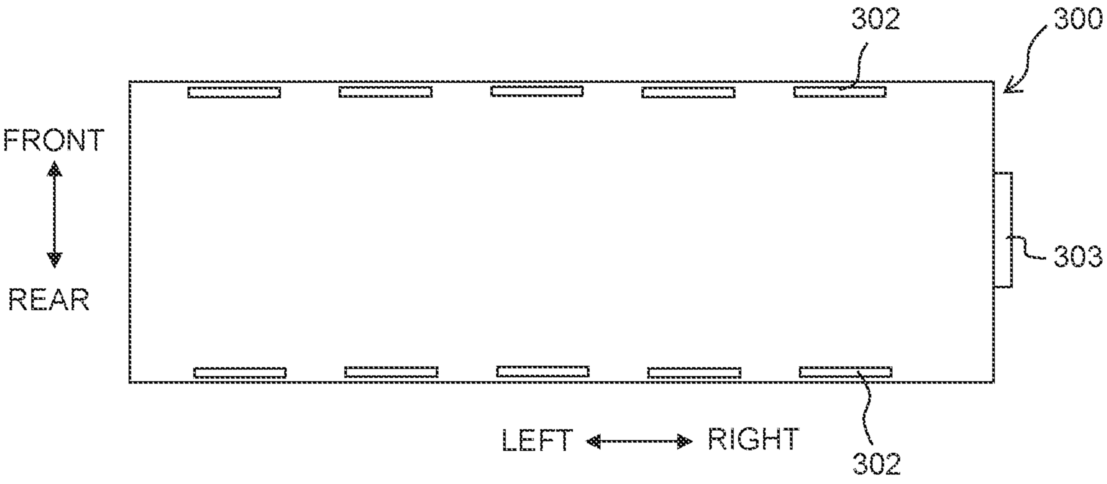
FIG. 6B is a bottom view of the relay substrate 300.

As depicted in FIGS. 6A and 6B, the relay substrate 300 is provided with 10 pieces of a first connector 301, 10 pieces of a second connector 302 and a power source connector 303. The power source connector 303 is arranged at a right end of the relay substrate 300. As described above, the power source input port 211 is provided on the side wall 202R on the right side of the second casing 200. As depicted in FIG. 5, the power source connector 303 of the relay substrate 300 and the power source input port 211 are connected by a power source cable 304. Further, the ten first connectors 301 are arranged on the upper surface, of the relay substrate 300, which is exposed in the first space S1. In other words, the ten first connectors 301 are arranged on the upper surface, of the relay substrate 300, facing the first space S1. The ten first connectors 301 are arranged in two rows in the front-rear direction (width direction). Each of the rows of the first connectors 301 includes 5 pieces of the first connector 301 arranged in the left-right direction (depth direction). Namely, an extending direction (row direction) of the row of the first connectors 301 is parallel to the depth direction (left-right direction). The ten second connectors 302 are arranged on the lower surface, of the relay substrate 300, which is exposed in the second space S2. In other words, the ten second connectors 302 are arranged on the lower surface, of the relay substrate 300, facing the second space S2. The ten second connectors 302 are also arranged in two rows in the width direction (front-rear direction); and each of the rows of the second connectors 302 includes 5 pieces of the second connector 302 arranged in the depth direction (left-right direction). Namely, an extending direction (row direction) of the row of the second connectors 302 is parallel to the depth direction (left-right direction). Note that the upper surfaced of the relay substrate 300 corresponds to a "first surface" of the relay substrate of the present disclosure, and the lower surface of the relay substrate 300 corresponds to a "second surface" of the relay substrate of the present disclosure.

The relay substrate 300 is provided with a non-illustrated wiring connecting each of 10 pieces of the first connector 301 to one of 10 pieces of the second connector 302. With this, the second connectors 302 arranged on the lower surface of the relay substrate 300 and the first connectors 301 arranged on the first surface of the relay substrate 300 are electrically connected. Further, the relay substrate 300 has a non-illustrated electrical source wiring connecting the power source connector 303 and the ten first connectors 301 and a non-illustrated electrical source wiring connecting the power source connector 303 and the ten second connectors 302. With this, the relay substrate 300 is capable of supplying the electric power from the non-illustrated external power source to a device, etc., connected to each of the first connectors 301 and the second connectors 302. Note that the non-illustrate external power source is different from a power source 112, of the rigid substrate 110, which will be described later on.

<Rigid Substrate 110>

Figure 7:
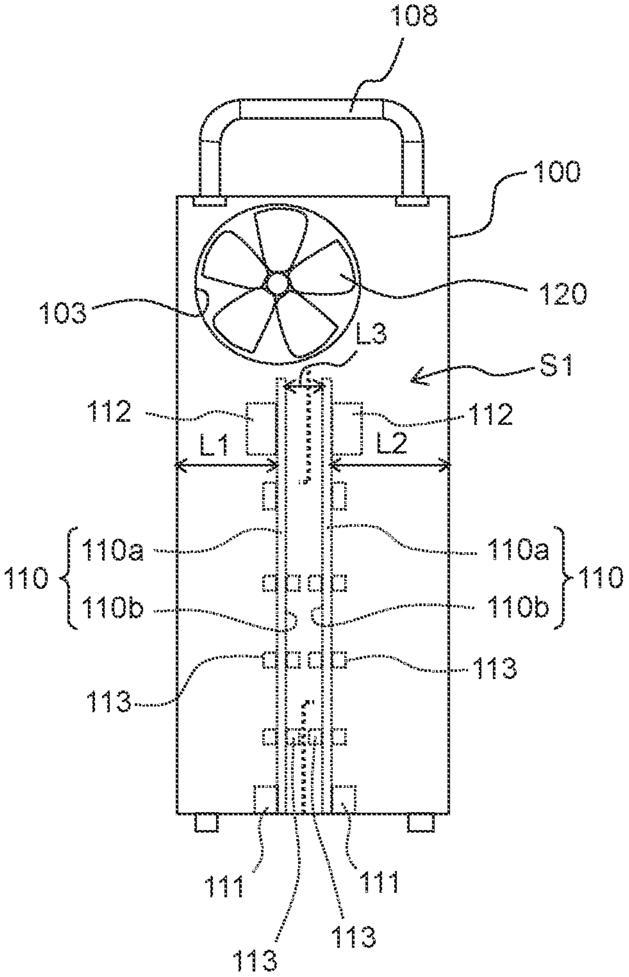
FIG. 7 is a rear view of the first casing 100.
Figure 10:
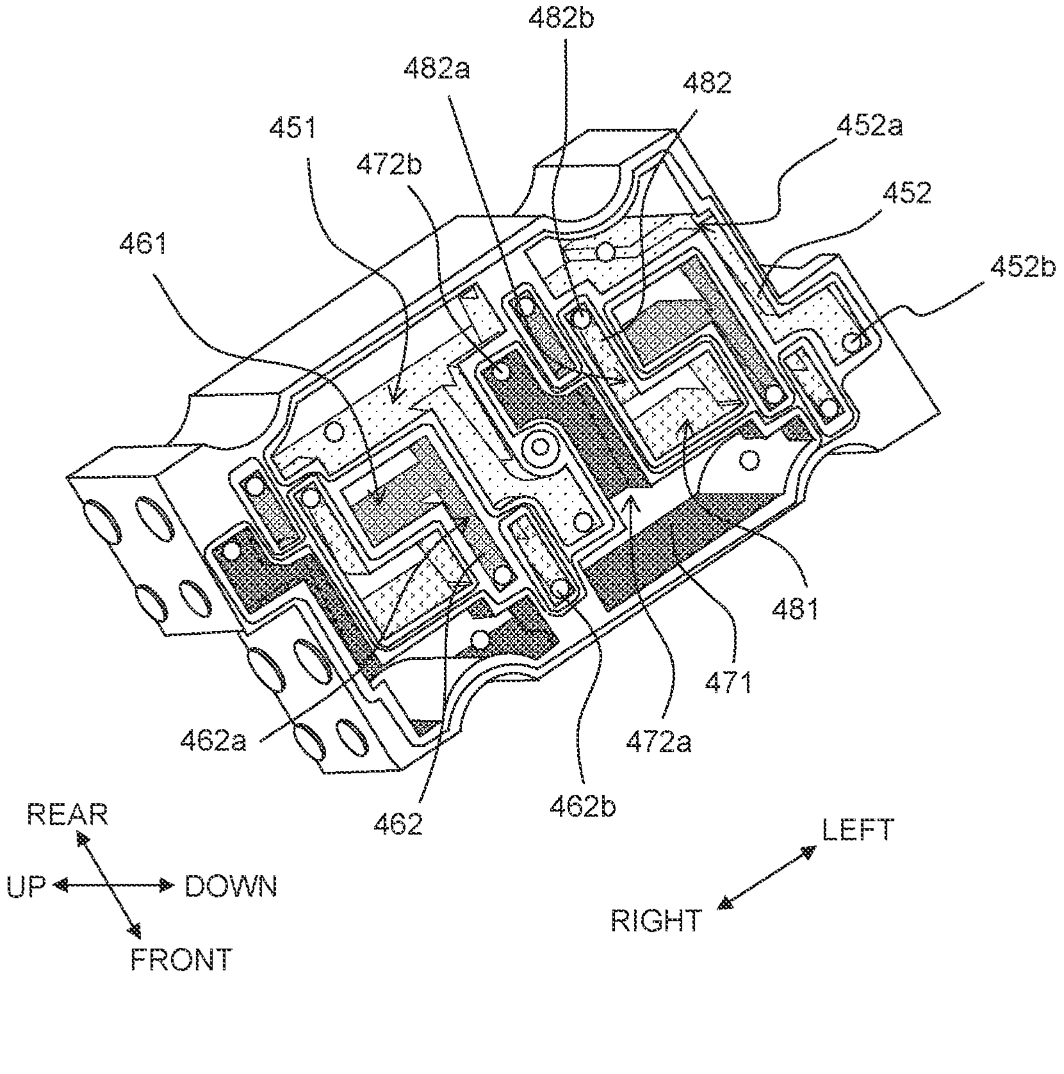
FIG. 10 is a perspective view of the tank body 413 as seen from therebelow.

As depicted in FIGS. 5 and 7, 10 pieces of the rigid substrate 110 are arranged in the first space S1. As depicted in FIG. 7, each of the rigid substrates 110 is a rectangular substrate having a first surface **110*a* and a second surface 110*b*, and is a head controlling substrate configured to drive and control the head 11. Each of the rigid substrates 110 has a connector 111, a power source 112 and a plurality of circuit elements 113 which are mounted thereon. The power source 112 and a part of the plurality of circuit elements 113 are mounted on the first surface 110*a* of the rigid substrate 110. Remaining circuit elements 113, included in the plurality of circuit elements 113, are mounted on the second surface 110*b* which is a rear surface of the first surface 110*a*. Note that all of the plurality of circuit elements 113 are not of a same kind, and the plurality of circuit elements 113** includes a plurality of kinds of circuit element.

The power source 112 mounted on the first surface **110*a* of each of the rigid substrates 110 is a power source element configured to generate a driving signal of a non-illustrated piezoelectric actuator included in the head 11. The power source 112 is not mounted on the second surface 110*b* of each of the rigid substrates 110; circuit elements configured to process a high speed signal are mounted on the second surface 110*b*, as the plurality of circuit elements 113. A height of the power source 112 mounted on the first surface 110*a* of each of the rigid substrates 110 is higher than a height of one of the plurality of circuit elements 113 mounted on the second surface 110*b* of each of the rigid substrates 110. Note that the term "height" described herein represents a height from each of the first surface 110*a* and the second surface 110*b* in a normal direction perpendicular to the rigid substrate 110 (parallel to the front-rear direction in FIG. 5**).

The connector 111 is arranged on a lower end of each of the rigid substrates 110, and is inserted into each of the first connectors 301 of the relay substrate 300. With this, the rigid substrates 110 are fixed so as to stand perpendicularly with respect to the relay substrate 300 (see FIG. 7). As described above, since the first connectors 301 are aligned in the two rows, the rigid substrates 110 are also arranged to be aligned in two rows. As depicted in FIG. 7, the rigid substrates 110 are arranged in the two rows, with rigid substrates 110 in one row and rigid substrates 110 in the other row being arranged back to back such that the first surfaces **110*a* each having the power source 112 mounted thereon do not face one another in the width direction (front-rear direction). Namely, in two rigid substrates 110, which are included in the ten rigid substrates 110 and which face or are opposite to each other in the width direction (front-rear direction), the second surfaces 110*b* thereof on which only the circuit elements 113 having the height lower than the height of the electric source 112 are mounted face each other. Further, regarding the two rigid substrates 110 facing each other in the width direction (front-rear direction), a distance L1 in the front-rear direction between the rigid substrate 110 on the front side and a lateral surface on the front side of the casing 100 and a distance L2 in the front-rear direction between the rigid substrate 110 on the rear side and a lateral surface on the rear side of the casing 100 are each greater than a distance L3 in the front-rear direction between the two rigid substrates 110** facing each other in the width direction (front-rear direction).

As described above, the fan 120 is capable of feeding wind or airflow in the aligning direction of the rows of the rigid substrates 110 (the depth direction, the left-right direction). Since the direction in which the airflow is fed is a direction parallel to the first surface 110*a* and the second surface 110*b* of each of the rigid substrates 110, the rigid substrates 110 do not hinder the flow of the airflow. Accordingly, it is possible to feed the air flow fed from the fan 120 up to the back (inner part) of the first casing 100, along the aligning direction of the rows of the rigid substrates 110 (the depth direction, the left-right direction), thereby making it possible to efficiently cool the 10 pieces of the rigid substrate 110.

The above-described distances L1 and L2 each correspond to the distance between the first surface 110*a* having the power sources 112 mounted thereon and the lateral surface of the first casing 100, and the above-described distance L3 corresponds to the distance between the second surfaces 110*b* on each of which the power source 112 is not mounted. As described above, since the distances L1 and L2 are greater than the distance L3, it is possible to send the airflow efficiently to the power sources 112 of which heat generating amount is great, and to cool the power sources 112.

Next, members arranged in the second space S2 will be explained. The lower surface of the relay substrate 300 is exposed in the second space S2 of the second casing 200. Further, the line head 20 including the ten heads 11, the ten flexible substrates 280, the tank 400, the heater 250, and the plurality of tubes 416 connecting the heads 11 and the tank 400 are arranged in the second space S2.

<Flexible Substrate 280>

One end of each of the flexible substrates 280 is connected to one of the second connectors 302 of the relay substrate 300. Further, the other end of each of the flexible substrates 280 is connected to one of the heads 11. Note that, as described above, the second connectors 302 of the relay substrate 300 are electrically connected to the first connectors 301 arranged on the upper surface of the relay substrate 300, and further that the first connectors 301 are electrically connected to the connectors 111 of the rigid substrates 110. Namely, the rigid substrates 110, each of which is a head controlling substrate configured to drive and control one of the heads 11, is connected to one of the heads 11 via the relay substrate 300 and one of the flexible substrates 280. With this, each of the rigid substrates 110 is capable of transmitting a control signal with respect to one of the heads 11, such as the driving signal with respect to the non-illustrated piezoelectric actuator of one of the heads 11, via the relay substrate 300 and one of the flexible substrates 280.

<Tank 400>

Figure 8:
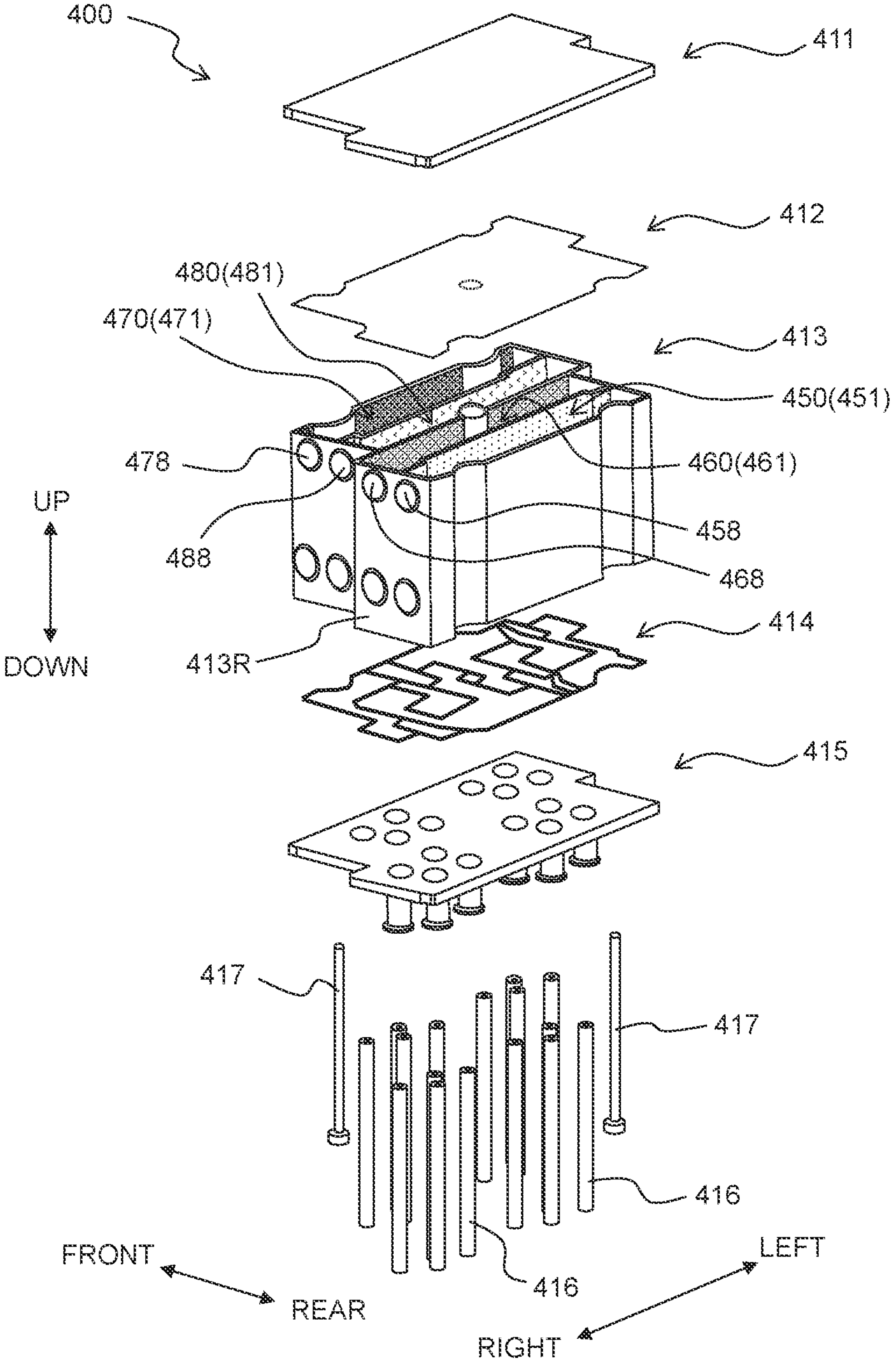
FIG. 8 is an exploded perspective view of a tank 400.
Figure 11:
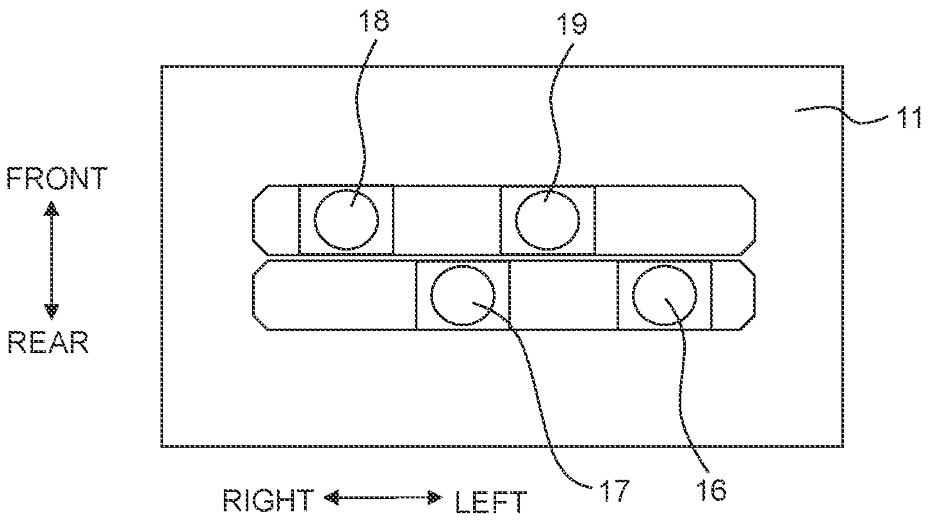
FIG. 11 is a schematic top view of the head 11.
Figure 14:
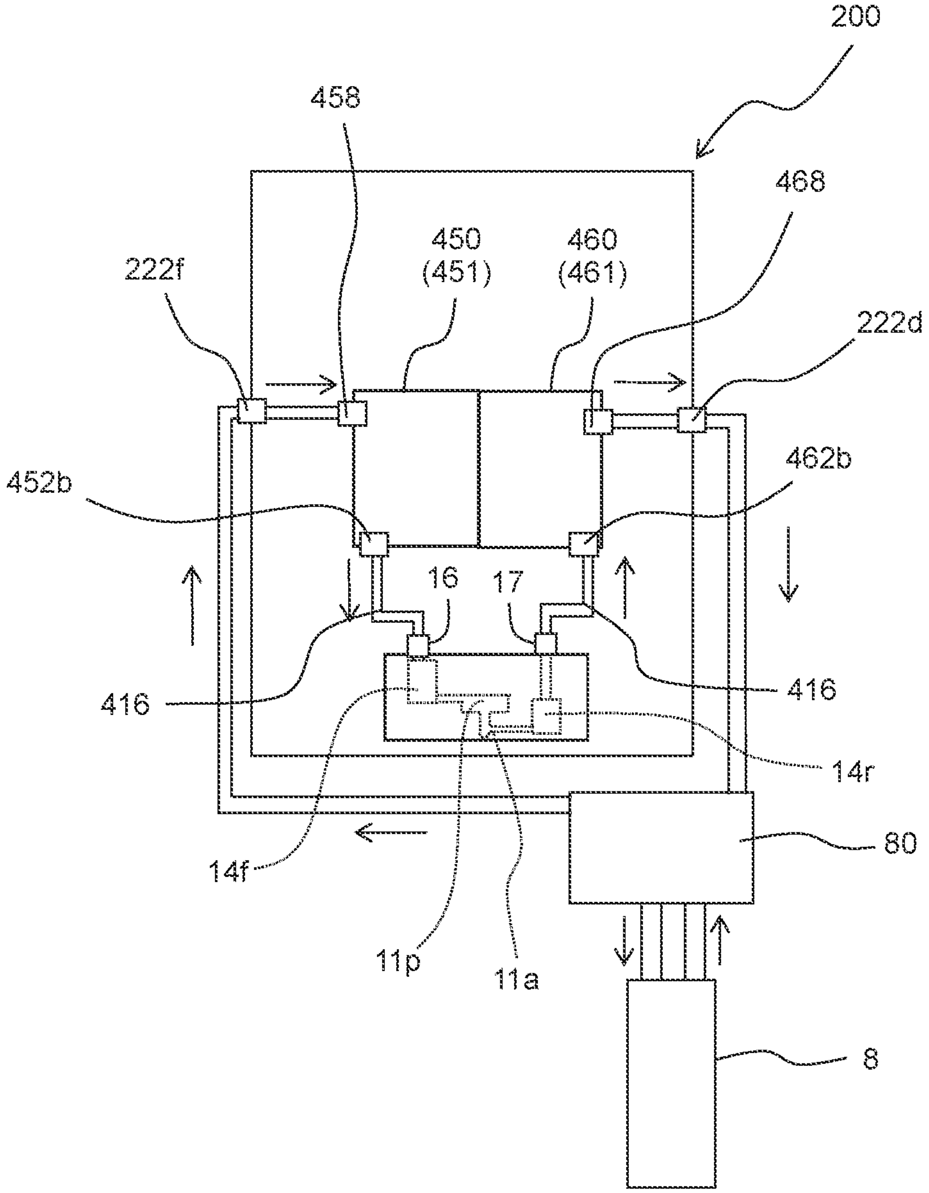
FIG. 14 is a view for explaining a circulating route of an ink.
Figure 15:
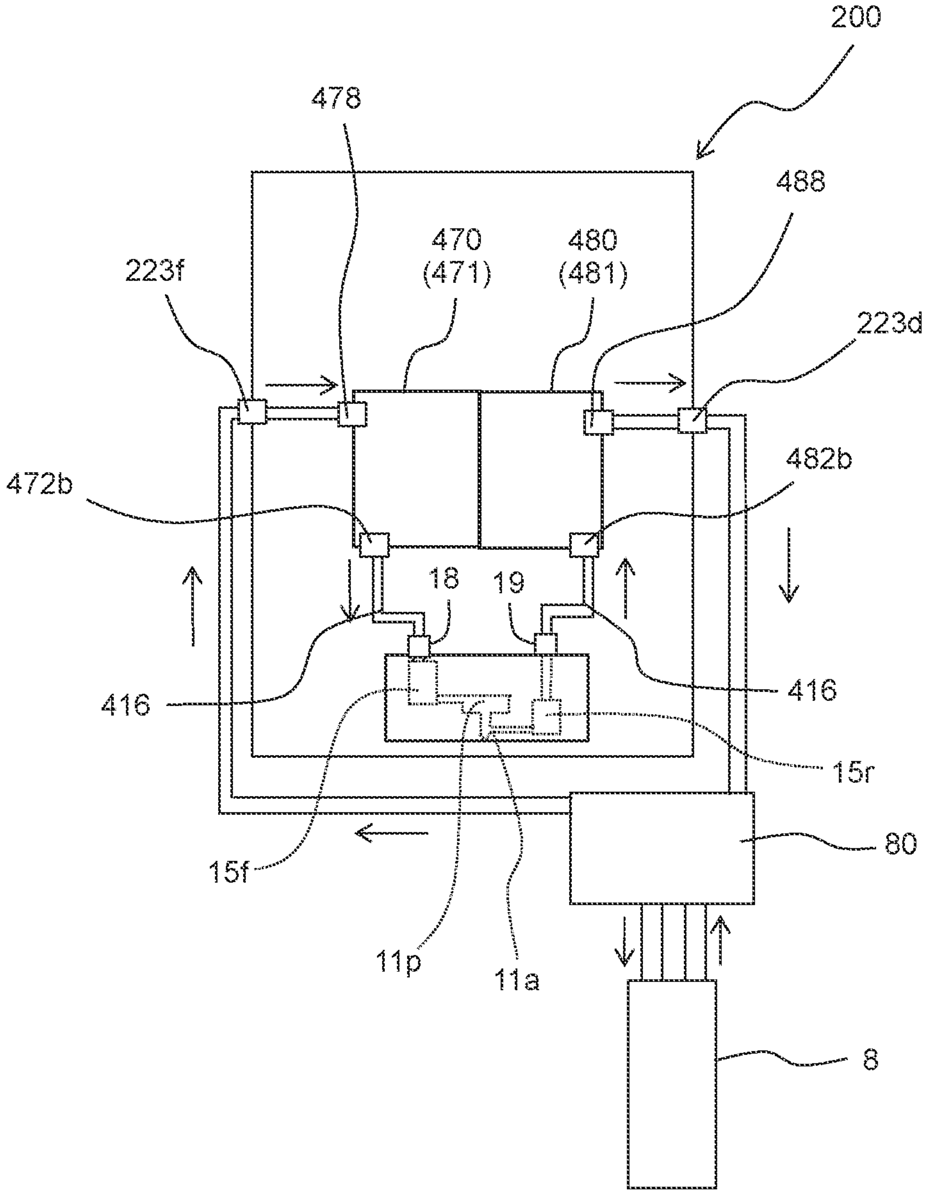
FIG. 15 is a view for explaining another circulating route of the ink.

As depicted in FIG. 5, the tank 400 is arranged in the second space S2 at a location below the relay substrate 300. The tank 400 has a shape of a substantially rectangular parallelepiped which is long in the left-right direction. As depicted in FIG. 8, the tank 400 is mainly provided with: a top plate 411, an upper seal rubber 412, a tank body 413, a lower seal rubber 414, a bottom plate 415 and the plurality of tubes 416. The tank body 413 is formed of a resin, and can be formed, for example, by an injection molding. The top plate 411 and the bottom plate 415 may be formed of a resin or a metallic material. The top plate 411 is fixed to an upper part of the tank body 413, in a state that the top plate 411 sandwiches the upper seal rubber 412 between the top plate 411 and the tank body 413. Further, the bottom plate 415 is fixed to a lower part of the tank body 413, in a state that the bottom plate 415 sandwiches the lower seal rubber 414 between the bottom plate 415 and the tank body 413. The top plate 411 and the bottom plate 415 are screwed to the tank body 413 by a plurality of screws 417. Note that as depicted in FIG. 11, one piece of the head 11 is provided with a first supply port 16, a first discharge port 17, a second supply port 18 and a second discharge port 19. As will be described later on, two ink circulating routes corresponding to the two nozzle rows, respectively, are provided on the head 11 (see FIGS. 14 and 15). As depicted in FIG. 14, one end of the one of the ink circulating routes is connected to the first supply port 16, and the other end of the one of the ink circulating routes is connected to the first discharge port 17. Further, as depicted in FIG. 15, one end of the other of the ink circulating routes is connected to the second supply port 18, and the other end of the other of the ink circulating routes is connected to the second discharge port 19. The tank 400 and one piece of the head 11 are connected to each other by four pieces of the tube 416. Among the four tubes 416, a first tube 416 is communicated with the first supply port 16, a second tube 416 is communicated with the first discharge port 17, a third tube 416 is communicated with the second supply port 18 and a fourth tube 416 is communicated with the second discharge port 19. Since the tank 400 is connected to 10 pieces of the head 11, the tank 400 is connected to 40 pieces of the tube 416. However, in order to simplify the drawing, the number of the tube 416 connected to the tank 400 is reduced in the illustration of FIG. 8.

Figure 9:
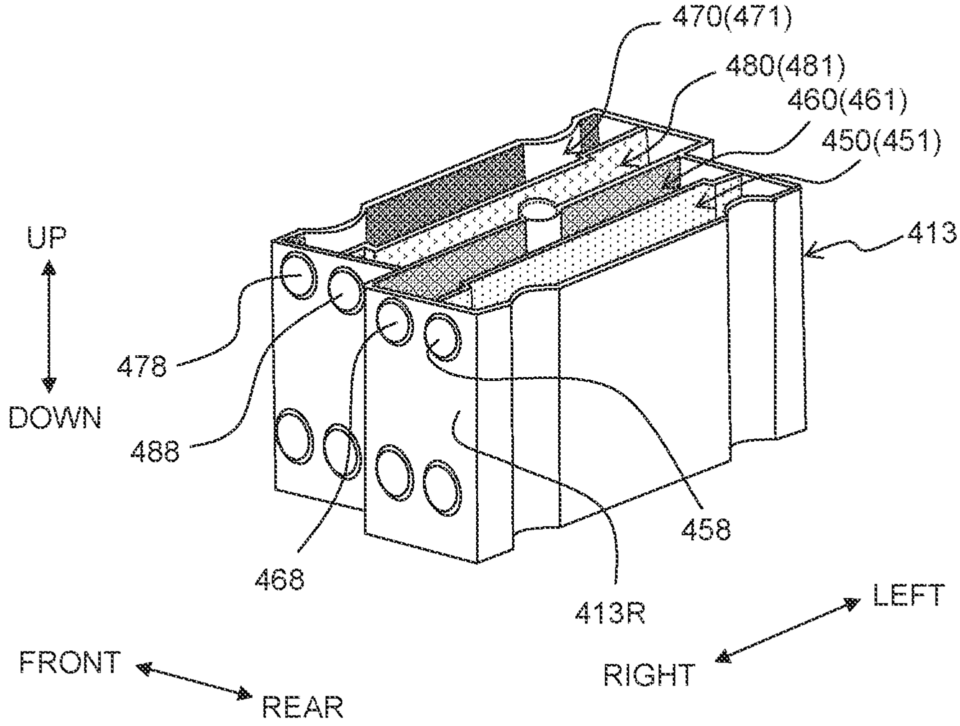
FIG. 9 is a perspective view of a tank body 413 as seen from thereabove.

As depicted in FIGS. 8 and 9, a first supply channel 450, a first discharge channel 460, a second supply channel 470 and a second discharge channel 480 are formed in the tank body 413. Note that these four channels each extend in the left-right direction. Further, these four channels are arranged side by side in the front-rear direction. Note that these four channels are arranged, from the rear side toward the front side in the front-rear direction, namely, from the upstream side toward the downstream side in the conveying direction, in an order of the first supply channel 450, the first discharge channel 460, the second discharge channel 480 and the second supply channel 470. Note that in FIGS. 8 and 9, only a part of each of the first supply channel 450, the first discharge channel 460, the second supply channel 470 and the second discharge channel 480 is depicted so that the length in the left-right direction of the tank 400 becomes (appears) to be short, in order to simplify the drawings.

A first supply port 458 communicating with the first supply channel 450, a first discharge port 468 communicating with the first discharge channel 460, a second discharge port 488 communicating with the second discharge channel 480, and a second supply port 478 communicating with the second supply channel 470 are provided on a side wall 413R on the right side of the tank body 413.

<Ink Channel Inside Tank 400>

Figure 12:
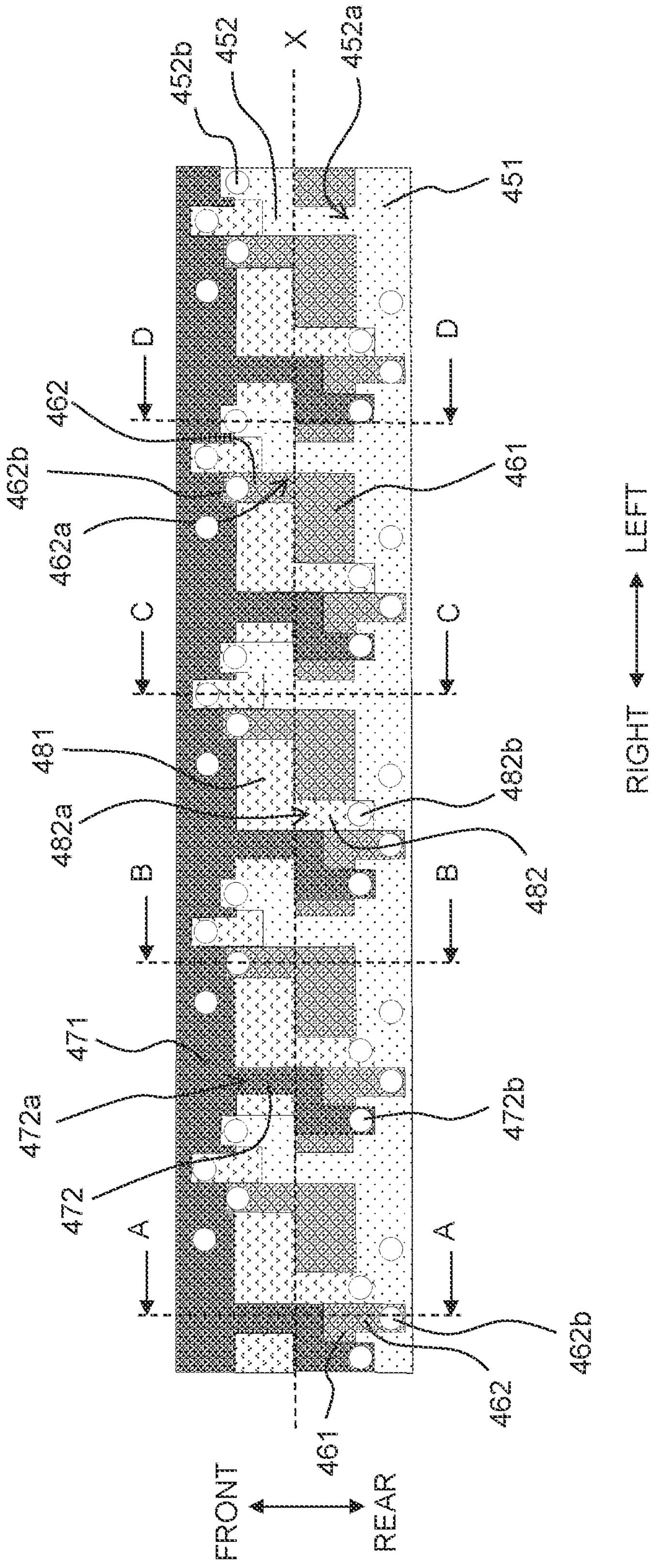
FIG. 12 is a view for explaining a channel in the tank 400.

Next, an ink channel formed in the inside of the tank 400 will be explained in further detail. As depicted in FIGS. 10 and 12, the first supply channel 450 has a first basal supply channel 451, and 10 pieces of a first branched supply channel 452 which are branched from the first basal supply channel 451 at a location below the first basal supply channel 451. The ten first branched supply channels 452 correspond to the ten heads 11, respectively. Note that in FIG. 10, only a part of each of the first supply channel 450, the first discharge channel 460, the second supply channel 470 and the second discharge channel 480 is depicted so that the length in the left-right direction of the tank 400 becomes (appears) to be short, in order to simplify the drawings, in a similar manner regarding FIGS. 8 and 9. Further, in FIG. 10, only a part of the ten first branched supply channels 452 is depicted. One end 452*a* of each of the first branched supply channels 452 is connected to the first basal supply channel 451, and the other end 452*b* of each of the first branched supply channels 452 is connected to one of the tubes 416.

As depicted in FIGS. 10 and 12, the first discharge channel 460 has a first basal discharge channel 461, and 10 pieces of a first branched discharge channel 462 which are branched from the first basal discharge channel 461 at a location below the first basal discharge channel 461. The ten first branched discharge channels 462 correspond to the ten heads 11, respectively. Note that in FIG. 10, only a part of the ten first branched discharge channels 462 is depicted so as to simplify the drawing. One end 462*a* of each of the first branched discharge channels 462 is connected to the first basal discharge channel 461, and the other end 462*b* of each of the first branched discharge channels 462 is connected to one of the tubes 416.

As depicted in FIGS. 10 and 12, the second supply channel 470 has a second basal supply channel 471, and 10 pieces of a second branched supply channel 472 which are branched from the second basal supply channel 471 at a location below the second basal supply channel 471. The ten second branched supply channels 472 correspond to the ten heads 11, respectively. Note that in FIG. 10, only a part of the ten second branched supply channels 472 is depicted so as to simplify the drawing. One end 472*a* of each of the second branched supply channels 472 is connected to the second basal supply channel 471, and the other end 472*b* of each of the second branched supply channels 472 is connected to one of the tubes 416.

As depicted in FIGS. 10 and 12, the second discharge channel 480 has a second basal discharge channel 481, and 10 pieces of a second branched discharge channel 482 which are branched from the second basal discharge channel 481 at a location below the second basal discharge channel 481. The ten second branched discharge channels 482 correspond to the ten heads 11, respectively. Note that in FIG. 10, only a part of the ten second branched discharge channels 482 is depicted so as to simplify the drawing. One end 482*a* of each of the second branched discharge channels 482 is connected to the second basal discharge channel 481, and the other end 482*a* of each of the second branched discharge channels 482 is connected to one of the tubes 416.

As depicted in FIG. 11, the first supply port 16, the first discharge port 17, the second supply port 18 and the second discharge port 19 are arranged in the upper surface of each of the heads 11. The first supply port 16 and the first discharge port 17 are arranged in the left-right direction, and the first supply port 16 is arranged on the left side of the first discharge port 17. The second supply port 18 and the second discharge port 19 are arranged in the left-right direction, and the second supply port 18 is arranged on the right side of the second discharge port 19. Further, the pair of the first supply port 16 and the first discharge port 17 is arranged on the rear side of the pair of the second supply port 18 and the second discharge port 19.

Corresponding to the above-described arrangement of the first supply port 16, the first discharge port 17, the second supply port 18 and the second discharge port 18 in the upper surface of each of the heads 11, the other end 452*b* of each of the first branched supply channels 452, the other end 462*b* of each of the first branched discharge channels 462, the other end 472*b* of each of the second branched supply channels 472 and the other end 482*b* of each of the second branched discharge channels 482 are arranged in a similar manner, as depicted in FIG. 12. Namely, the other end 452*b* of each of the first branched supply channels 452 and the other end 462*b* of each of the first branched discharge channels 462 are arranged in the left-right direction, and the other end 472*b* of each of the second branched supply channels 472 and the other end 482*b* of each of the second branched discharge channels 482 are arranged in the left-right direction.

As described above, corresponding to that the ten heads 11 are arranged in the staggered manner so as to form the two head rows extending in the left-right direction, the set of the other end 452*b* of each of the first branched supply channels 452, the other end 462*b* of each of the first branched discharge channels 462, the other end 472*b* of each of the second branched supply channels 472 and the other end 482*b* of each of the second branched discharge channels 482, which corresponds to one head 11, are also arranged in a staggered manner so as to form two rows extending in the left-right direction. Namely, the set of the other end 452*b* of each of the first branched supply channels 452, the other end 462*b* of each of the first branched discharge channels 462, the other end 472*b* of each of the second branched supply channels 472, and the other end 482*b* of each of the second branched discharge channels 482, which corresponds to one head 11, are arranged at positions overlapping, respectively, with the first supply port 16, the first discharge port 17, the second supply port 18 and the second discharge port 19 of the head 11, in the up-down direction.

<Shape of First Branched Supply Channel 452 (Second Branched Supply Channel 472)>

Next, the shape of the first branched supply channel 452 will be explained, with reference to the drawings. Note that since the second branched supply channel 472 has a shape which is symmetrical to the first branched supply channel 452 with respect to a line X in FIG. 12, any detailed explanation for the second branched supply channel 472 will be omitted.

Figure 13A:
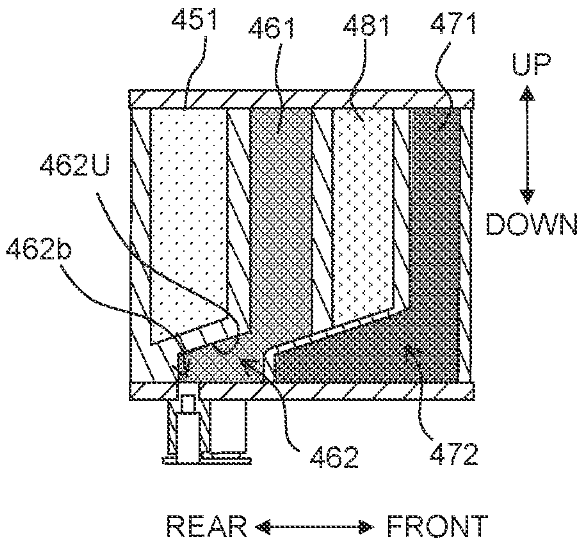
FIG. 13A is a cross-sectional view taken along a cross section "A" in FIG. 10.
Figure 13C:
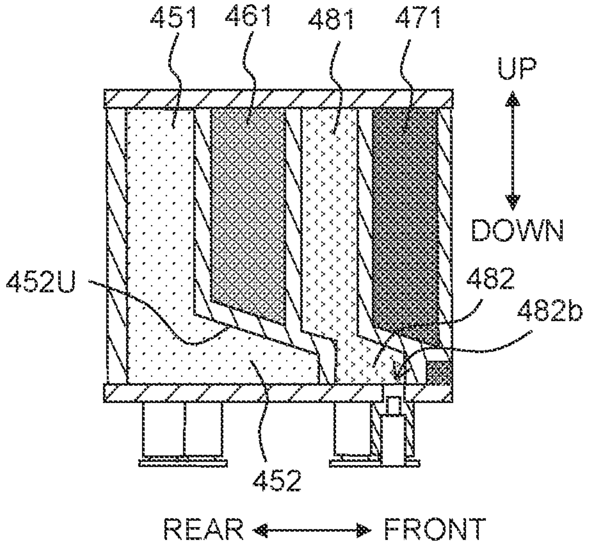
FIG. 13C is a cross-sectional view taken along a cross section "C" in FIG. 10.
Figure 13B:
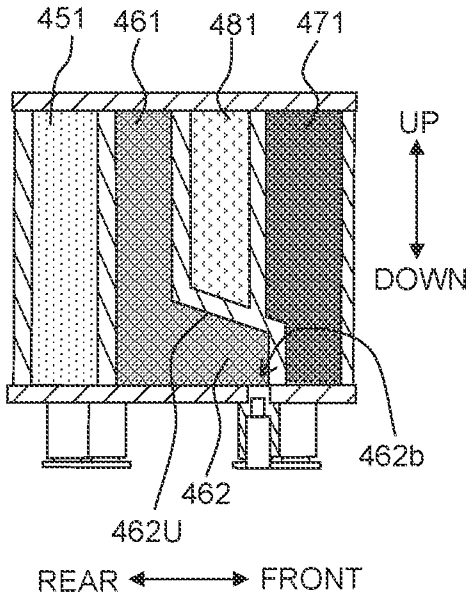
FIG. 13B is a cross-sectional view taken along a cross section "B" in FIG. 10.
Figure 13D:
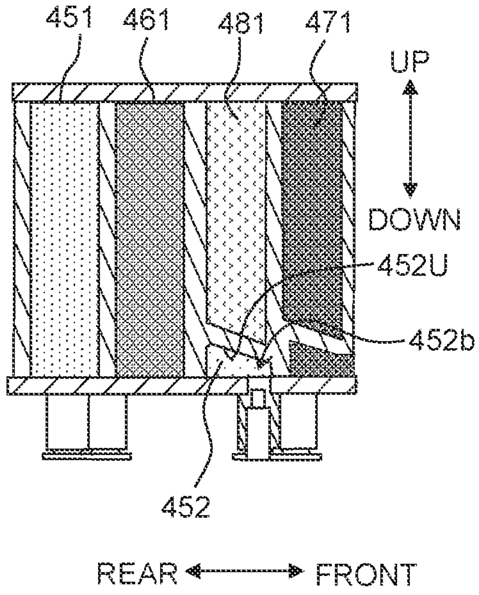
FIG. 13D is a cross-sectional view taken along a cross section "D" in FIG. 10.

In the following explanation, the first basal supply channel 451, the first basal discharge channel 461, the second basal supply channel 471 and the second basal discharge channel 481 are collectively referred to as "basal channels". As depicted in FIG. 12, the first basal supply channel 451 is arranged rearmost among the four basal channels. As depicted in FIG. 12, five first branched supply channels 452 extend frontward from the first basal supply channel 451. Note that each of the first branched supply channels 452 bends leftward at an intermediate part thereof, and then extends frontward again. As depicted in FIGS. 13C and 13D, each of the first branched supply channels 452 extends frontward as if crawling under the first basal discharge channel 461. Note that an upper surface 452U of each of the first branched supply channels 452 is inclined further downward as approaching closer to the other end 452*b*. Note that an inclination angle of the upper surface 452U with respect to the horizontal plane is greater than an inclination angle of the nozzle surface of each of the line head assemblies 10 with respect to the horizontal plane which is defined in a case that the line head assemblies 10 are attached to the arch frame 41. Therefore, even in a case that the line head assemblies 10 are attached to the arch frame 41 so that each of the line head assemblies 10 is inclined with respect to the horizontal plane, the upper surface 452U of the first branched supply channel 452 is inclined further downward as approaching closer to the other end 452*b*.

<Shape of First Branched Discharge Channel 462 (Second Branched Discharge Channel 482)>

Next, the shape of the first branched discharge channel 462 will be explained, with reference to the drawings. Note that since the second branched discharge channel 482 has a shape which is symmetrical to the first branched discharge channel 462 with respect to the line X in FIG. 12, any detailed explanation for the second branched discharge channel 482 will be omitted.

As depicted in FIG. 12, the first basal discharge channel 461 is arranged second rearmost among the four basal channels. As depicted in FIG. 12, five first branched discharge channels 462 extends frontward from the first basal discharge channel 461. As depicted in FIG. 13B, each of the first branched discharge channels 462 extend frontward as if crawling under the second basal discharge channel 481. Note that an upper surface 462U of each of the first branched discharge channels 462 is inclined further downward as approaching closer to the other end 462*b*. Note that an inclination angle of the upper surface 462U with respect to the horizontal plane is greater than the inclination angle of the nozzle surface of each of the line head assemblies 10 with respect to the horizontal plane which is defined in a case that the line head assemblies 10 are attached to the arch frame 41. Therefore, even in a case that the line head assemblies 10 are attached to the arch frame 41 so that each of the line head assemblies 10 is inclined with respect to the horizontal plane, the upper surface 462U of each of the first branched discharge channels 462 is inclined further downward as approaching closer to the other end 462*b*.

Further, as depicted in FIG. 12, the five first branched discharge channels 462 extend rearward from the first basal discharge channel 461. As depicted in FIG. 13A, each of the first branched discharge channels 462 extends rearward as if crawling under the first basal supply channel 451. Note that the upper surface 462U of each of the first branched discharge channels 462 is inclined further downward as approaching closer to the other end 462*b*. Note that the inclination angle of the upper surface 462U with respect to the horizontal plane is greater than the inclination angle of the nozzle surface of each of the line head assemblies 10 with respect to the horizontal plane which is defined in a case that the line head assemblies 10 are attached to the arch frame 41. Therefore, even in a case that the line head assemblies 10 are attached to the arch frame 41 so that each of the line head assemblies 10 is inclined with respect to the horizontal plane, the upper surface 462U of each of the first branched discharge channels 462 is inclined further downward as approaching closer to the other end 462*b*.

<Connection Between Tank 400 and Heads 11>

Next, connection between the tank 400 and the heads 11 will be explained. Although not depicted in the drawings, the other end 452*b* of each of the first branched supply channels 452 and the first supply port 16 of one of the heads 11 is connected by the tube 416. Similarly, the other end 462*b* of each of the first branched discharge channels 462 and the first discharge port 17 of one of the heads 11 is connected by the tube 416. The other end 472*b* of each of the second branched supply channels 472 and the second supply port 18 of one of the heads 11 is connected by the tube 416. The other end 482*b* of each of the second branched discharge channels 482 and the second discharge port 19 of one of the heads 11 is connected by the tube 416. As described above, the other end 452*b* of each of the first branched supply channels 452, the other end 462*b* of each of the first branched discharge channels 462, the other end 472*b* of each of the second branched supply channels 472 and the other end 482*b* of each of the second branched discharge channels 482 which corresponds to one piece of the head 11 are arranged, respectively, at positions overlapping in the up-down direction with the first supply port 16, the first discharge port 17, the second supply port 18 and the second discharge port 19, respectively, of the head 11. With this, it is possible to provide the connection in a state that the tubes 416 are extended so as not to cross one another, which in turn allows usage of tubes 416 of a same length.

<Heater 250>

In the present embodiment, since the UV-curable ink is used, it is necessary to maintain the temperature of the ink at a predetermined temperature. Accordingly, each of the line head assemblies 10 in the present embodiment is provided with the heater 250 configured to warm or heat the ink in the inside of the tubes 416 connecting the tank 400 and the head 11. As depicted in FIG. 5, the heater 250 is provided at a position overlapping with the tubes 416 in the front-rear direction. As the heater 250, it is allowable to use, for example, a carbon heater which generates heat by supplying an electric current to a carbon sheet. Note that in order to warm the ink inside the tank 400 in advance, it is also possible to provide, for example, a sheet-shaped heater in the lower surface of the tank 400.

<Circulation of Ink>

Next, the ink circulating routes will be explained, with referenced to FIGS. 14 and 15. At first, an explanation will be given about an ink circulating route included in the ink circulating routes and corresponding to one of the two nozzle rows included in the head 11, with reference to FIG. 14. As depicted in FIG. 14, the ink reservoir 8, the first ink supply port 222*f* and the first ink discharge port 222*d* of the second casing 200 are fluidly connected via the ink circulating mechanism 80. Note that the ink circulating mechanism 80 is a publicly known ink circulating system provided with a pump, a valve, an exhaust valve, etc., and any detailed explanation therefor will be omitted. By the ink circulating mechanism 80, the ink supplied from the ink reservoir 8 flows toward the first ink supply port 222*f* of the second casing 200. Further, the ink flows from the first ink supply port 222*f* of the second casing 200 toward the first supply channel 450 of the tank 400, and passes through the tube 416 from the other end 452*b* of each of the first branched supply channels 452 of the first supply channel 450, and flows into the first supply port 16 of the head 11. A first supply manifold 14*f*, the plurality of pressure chambers 11*p*, the plurality of nozzles 11*a* and a first return manifold 14*r* are formed, as the intra-head channel, in the inside of the head 11. The first supply manifold 14*f* and the first return manifold 14*r* are provided commonly with respect to the plurality of pressure chambers 11*p*. The plurality of pressure chambers 11*p* and the plurality of nozzles 11*a* correspond to one another in one-to-one basis. The ink supplied from the first supply port 16 flows from the first supply manifold 14*f* into the plurality of pressure chambers 11*p*. In a case that the non-illustrated piezoelectric actuator is driven so as to apply a discharge pressure (ejecting pressure) to a certain pressure chamber 11*p* as one of the plurality of pressure chambers 11*p*, an ink droplet of the ink is discharged or ejected from a nozzle 11*a*, among the plurality of nozzles 11*a*, communicating with the certain pressure chamber 11*p*. The ink which has not been discharged from the nozzle 11*a* is fed to the first return manifold 14*r*, passes through the first discharge port 17 and the tube 416 and flows into the first discharge channel 460 of the tank 400. The first discharge channel 460 of the tank 400 is connected to the first ink discharge port 222*d* of the second casing 200. The ink inflowed into the first discharge channel 460 passes through the first ink discharge port 222*d* and flows toward the ink reservoir 8. In such a manner, the ink can be circulated.

Next, an explanation will be given about an ink circulating route included in the ink circulating routes and corresponding to the other of the two nozzle rows included in the head 11, with reference to FIG. 15. As depicted in FIG. 15, the ink reservoir 8, the second ink supply port 223*f* and the second ink discharge port 223*d* of the second casing 200 are fluidly connected via the ink circulating mechanism 80. By the ink circulating mechanism 80, the ink supplied from the ink reservoir 8 flows toward the second ink supply port 223*f* of the second casing 200. Further, the ink flows from the second ink supply port 223*f* of the second casing 200 toward the second supply channel 470 of the tank 400, and passes through the tube 416 from the other end 472*b* of the second branched supply channel 472 of each of the second supply channels 470, and flows into the second supply port 18 of the head 11. A second supply manifold 15*f*, the plurality of pressure chambers 11*p*, the plurality of nozzles 11*a* and a second return manifold 15*r* are formed, as the intra-head channel, in the inside of the head 11. The second supply manifold 15*f* and the second return manifold 15*r* are provided commonly with respect to the plurality of pressure chambers 11*p*. The plurality of pressure chambers 11*p* and the plurality of nozzles 11*a* correspond to one another in one-to-one basis. The ink supplied from the second supply port 18 flows from the second supply manifold 15*f* into the plurality of pressure chambers 11*p*. In a case that the non-illustrated piezoelectric actuator is driven so as to apply a discharge pressure (ejecting pressure) to a certain pressure chamber 11*p* as one of the plurality of pressure chambers 11*p*, an ink droplet of the ink is discharged or ejected from a nozzle 11*a*, among the plurality of nozzles 11*a*, communicating with the certain pressure chamber 11*p*. The ink which has not been discharged from the nozzle 11*a* is fed to the second return manifold 15*r*, passes through the second discharge port 19 and the tube 416 and flows into the second discharge channel 480 of the tank 400. The second discharge channel 480 of the tank 400 is connected to the second ink discharge port 223*d* of the second casing 200. The ink inflowed into the second discharge channel 480 passes through the second ink discharge port 223*d* and flows toward the ink reservoir 8. In such a manner, the ink can be circulated.

<Action and Effect of Embodiment>

The line head assembly 10 is provided with the ten rigid substrates 110 each having the power source 112 mounted thereon, the ten heads 11, the tank 400, the plurality of tubes 416, the heater 250, the ten flexible substrates 280, the relay substrate 300, the first casing 100 having the airflow port 103 formed therein, and the second casing 200. The first space S1 is formed in the first casing 100, and the second space S2 is formed in the second casing 200. The first space S1 is arranged above the second space S1, and the relay substrate 300 is arranged, in the up-down direction, between the first space S1 and the second space S2. The ten rigid substrates 110 are arranged in the first space S1, and the tank 400, the heater 250, the plurality of tubes 416, and the plurality of flexible substrates 280 are arranged in the second space S2. The relay substrate 300 partitions the first space S1 and the second space S2 from each other.

Since the rigid substrates 110 each having the power source 112 mounted thereon are required to be cooled, the rigid substrates 110 are arranged in the first space S1 inside the first casing 110 in which the airflow port 103 is formed. In contrast, the members including the ink of which temperature is required to be maintained to be constant (the heads 11, the tubes 416 and the tank 400) and the heater 250 required for performing the temperature adjustment are arranged in the second space S2 inside the second casing 200. Here, since the first space S1 and the second space S2 are partitioned from each other by the relay substrate 300, any inflow or entering, to the second space S2, of the air in the first space S21 into which the outside air is taken via the airflow port 103 is suppressed. With this, any variation or fluctuation in the temperature of the second space S2, in which the temperature is adjusted by the heater 250, is suppressed. Such a configuration is particularly useful for a case of using, as the ink, a UV-curable ink of which temperature is greatly required to be maintained to be constant.

The first connectors 301 and the second connectors 302 are provided on the relay substrate 300. With this, it is possible to easily connect the rigid substrates 110 arranged in the first space S1 and the flexible substrates 280 arranged in the second space S2 electrically to one another, while suppressing any entering of the air in the first space S1 into the second space S2.

The opening 105 is formed in the lower surface of the first casing 100 and the opening 205 is formed in the upper surface of the second casing 200. The opening 105 and the opening 205 are overlapped with each other in the up-down direction. In the present embodiment, the relay substrate 300 is attached to the upper surface of the second casing 200 so that the relay substrate 300 closes the opening 205 in the upper surface of the second casing 200 from therebelow. By arranging the relay substrate 300 in such a manner, it is possible to easily close the opening 205 and the opening 105. Note that it is also allowable to attach the relay substrate 300 to the lower surface of the first casing 100 so that the relay substrate 300 closes the opening 105 from thereabove. Since the opening 105 and the opening 205 are overlapped with each other in the up-down direction, the relay substrate 300 is capable of closing the opening 205 and the opening 105 also in this case. Note that the rigid substrates 110 are arranged to extend upward while passing through the opening 105. Namely, a part of each of the rigid substrates 110 is arranged in the inside of the first space S1. By arranging the rigid substrates 110 in such a manner, the power source 112, which is mounted on each of the rigid substrates 110 and which is expected to generate the heat, can be arranged easily in the first space S1.

The above-described embodiment disclosed herein is exemplary in all the points, and is not restrictive or limiting. All the respective configurations indicated in the embodiment are not essential, and any change and/or omission may be made in each of the configuration, as necessary.

Figure 16:
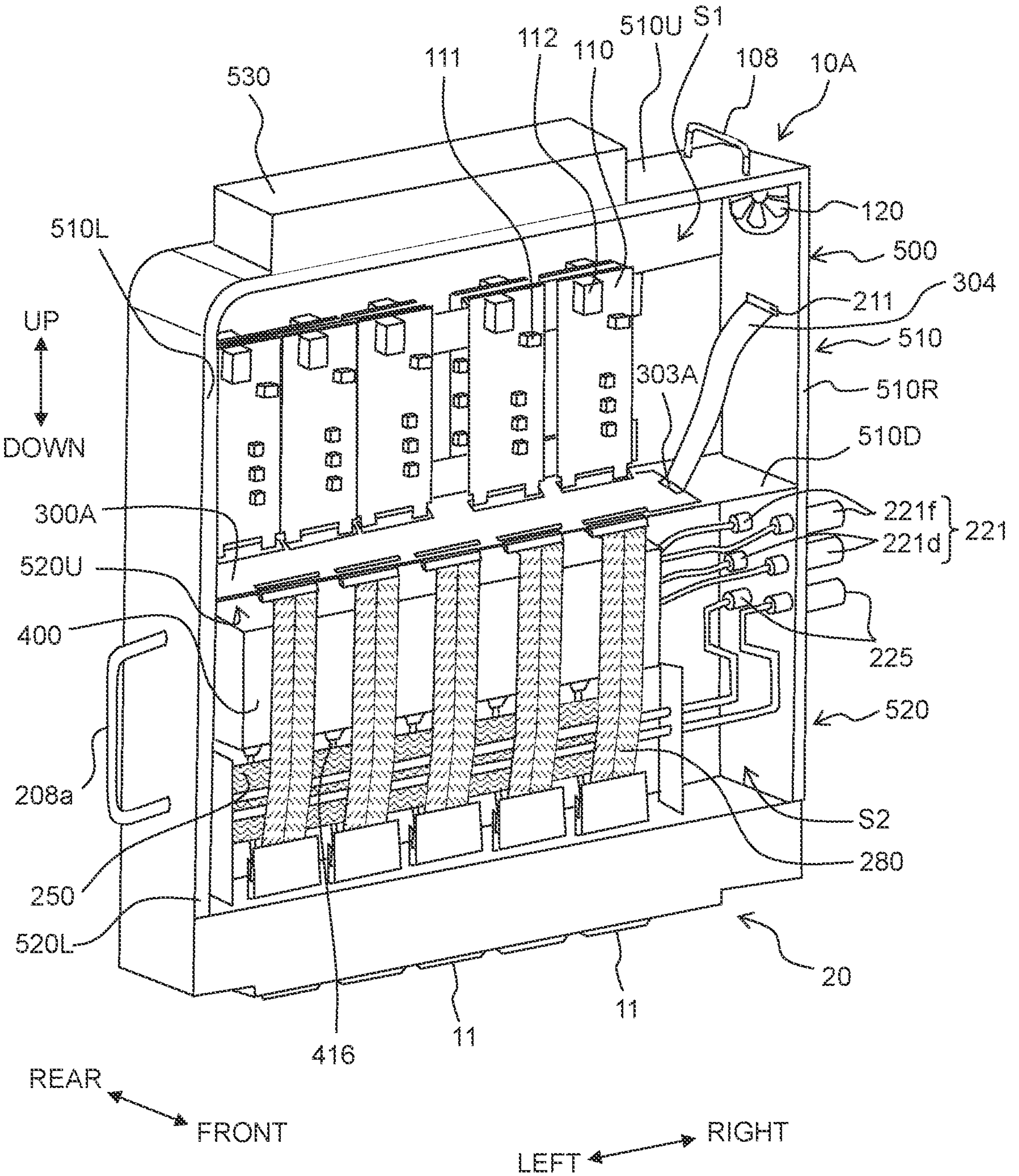
FIG. 16 is a perspective view of another casing.
Figure 17:
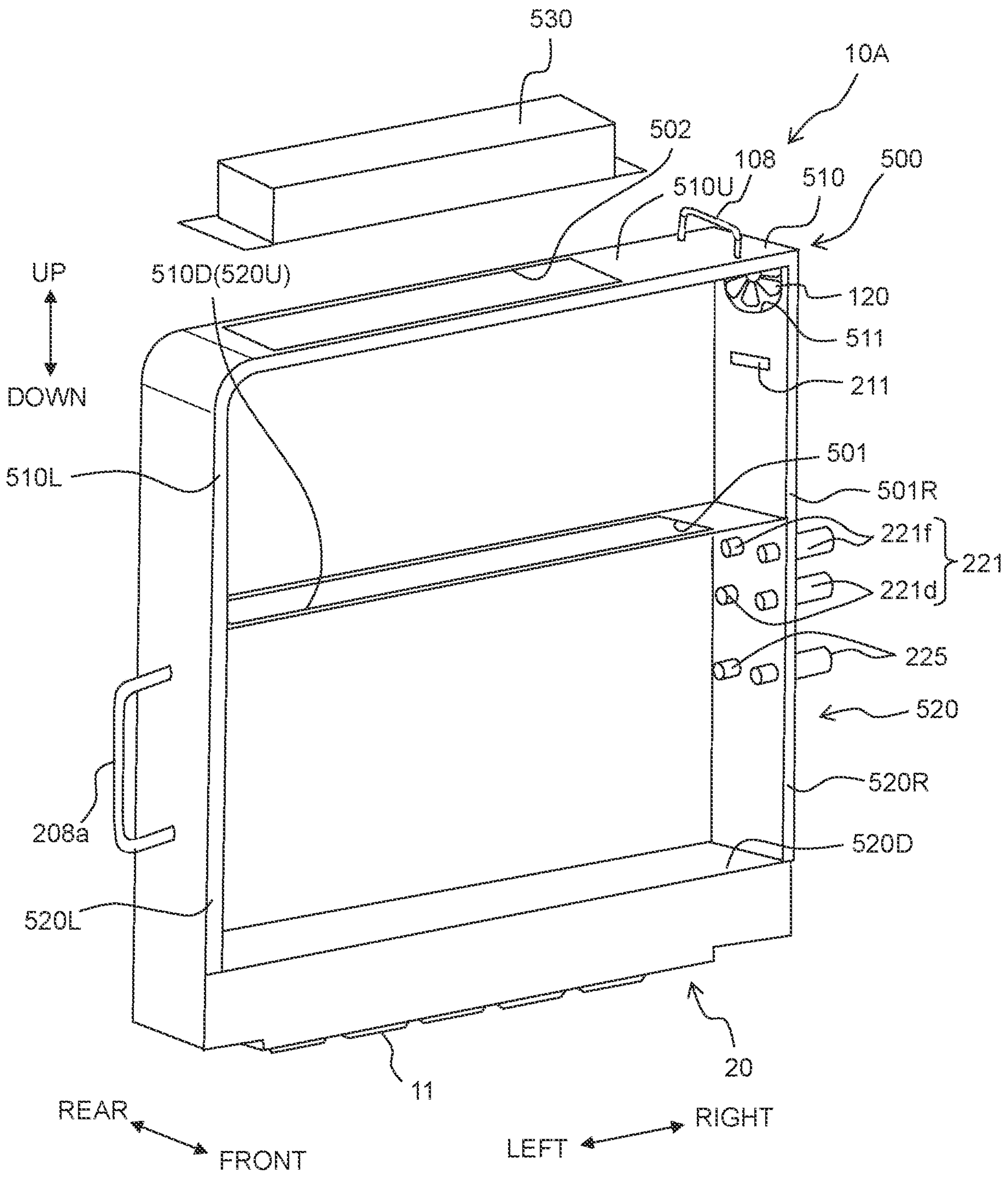
FIG. 17 is a schematic view for explaining another line head assembly 500.

In the above-descried embodiment, the first casing 100 and the second casing 200 are configured to be separable from each other. Accordingly, it is possible to remove the first casing 100 as necessary. As described above, the first grip 108 is provide on the top plate 101 of the first casing 100. A user is capable of separate the first casing 100 and the second casing 200 from each other, by lifting the first casing 100 upward while grasping the first grip 108. For example, since each of the rigid substrates 110 includes the power source 112, a frequency at which any failure or trouble occurs therein is higher than another substrate (for example, the relay substrate 300). In a case that there is any failure in the rigid substrate 110, it is possible to repair the rigid substrate 110 by removing the first casing 100 including the rigid substrate 110 from the second casing 200. The present disclosure, however, is not limited to such an aspect. For example, as depicted in FIGS. 16 and 17, a line head assembly 10A according to the present disclosure may have a casing 500. The casing 500 has a first frame part 510 defining the first space S1, a second frame part 520 defining the second space S2, and a lid 530 arranged above the first frame part 510. The first frame part 510 and the second frame part 520 are not configured to be separable from each other. The first frame part 510 is an example of a "first member" of the present disclosure, and the second frame part 520 is an example of a "second member" of the present disclosure. Note that the first frame part 510 corresponds to the first casing 100 as described above, and the second frame part 520 corresponds to the second casing 200 as described above. Among the configurations provided on the first frame part 510 and the second frame part 520, same reference numerals are affixed to any configurations which are common to those of the first casing 100 and the second casing 200, and any explanation therefor will be omitted. Further, since the members arranged in the two spaces S1 and S2 are similar to those of the above-described line head assembly 10, same reference numerals are affixed to any configurations which are common to those in the line head assembly 10, and any explanation therefor will be omitted.

As depicted in FIG. 17, the first frame part 510 is a frame member having a substantially rectangular parallelepiped shape. The first frame part 510 has a bottom surface 510D, a side wall 510R on the right side and a side wall 510L on the left side which extend upward respectively from both ends in the left-right direction of the bottom surface 510D, and an upper surface 510U. An opening 501 is formed in the bottom surface 510D. Further, another opening 502 is formed in the upper surface 510U. An airflow port 511 is formed in the side wall 510R on the right side of the first frame part 510. Similarly to the first casing 100, the fan 120 is attached to the airflow port 511. An electric power input port 211 is provided in the side wall 510R on the right side, at a location below the airflow port 511.

The second frame part 520 is a frame member having a substantially rectangular parallelepiped shape. The second frame part 520 has a bottom surface 520D, a side wall 520R on the right side and a side wall 520L on the left side which extend upward respectively from both ends in the left-right direction of the bottom surface 520D, and an upper surface 520U. The side wall 520R on the right side of the second frame part 520 is continued to the side wall 510R on the right side of the first frame part 510. The side wall 520L on the left side of the second frame part 520 is continued to the side wall 510L on the left side of the first frame part 510. Similarly to the second casing 200, four ink ports 221 and a set of cooling water ports 225 are provided on the side wall 520R on the right side.

The upper surface 520U of the second frame part 520 and the bottom surface 510D of the first frame part 510 correspond to an upper surface and a lower surface of a same plate member. Accordingly, the above-described opening 501 opens also in the upper surface 520U of the second frame part 520.

As depicted in FIG. 16, a relay substrate 300A is attached to the upper surface 520U of the second frame part 520 so that the relay substrate 300A closes the opening 501 from therebelow. Since the relay substrate 300A has a similar configuration to that of the above-described relay substrate 300, except that a power source connector 303A is arranged on the upper surface (a same surface on which the first connectors 301 are provided), any explanation therefor will be omitted. As depicted in FIG. 16, the power source connector 303A is connected to the power source input port 211.

Also in such a configuration, the first space S1 and the second space S1 are partitioned from each other by the relay substrate 300A, it is possible to suppress any inflow of the air in the first space S1, which is required to be cooled by air cooling, into the second space S2. With this, it is possible to suppress any variation or fluctuation in the temperature, in the second space S2, which is required to be maintained at a constant temperature.

Note that the lid 530 is firmly fixed to the upper surface 510U of the first frame part 510, with a screw, etc. As depicted in FIG. 17, the lid 530 is arranged so as to cover the opening 502 from thereabove. By removing the lid 530, it is possible to expose the opening 502. As described above, since each of the rigid substrates 110 includes the power source 112, a frequency at which any failure or trouble occurs therein is higher than another substrate (for example, the relay substrate 300A). In the line head assembly 10A, however, by removing the lid 530, it is possible to expose the opening 502 so that the user can access to the space S1 from the opening 502. With this, it is possible to easily exchange the rigid substrate 110 arranged in the space S1, without separating the first frame part 510 from the second frame part 520.

In the above-described embodiment, the number of the line head assembly 10 is 3 (three). The present disclosure, however, is not limited to such an aspect. The number, arrangement, etc., of the line head assembly 10 may be appropriately changed. Similarly, the number, the arrangement, etc., of the head 11 included in one piece of the line head 20 may be appropriately changed. Further, the number, arrangement, etc., of the nozzle 11*a* included in each of the heads 11 may also be appropriately changed. Furthermore, in the embodiment, although the controller 7 is provided on the printing apparatus 1, the present disclosure is not limited to or restricted by such an aspect. For example, it is allowable to provide the controller 7 on the line head assembly 10.

In the above-described embodiment, the recording medium which is wound in a roll shape (for example, rolled paper or rolled paper sheet) is used as the recording medium 4. However, the present disclosure is not limited to or restricted by such an aspect; it is allowable to use a recording medium 4 of an appropriate shape and material, as necessary. In the embodiment, the structure, shape, material, etc., of the tank 400 may be changed as appropriate. For example, in the embodiment, the tank 400 is connected to the ten heads 11. The present disclosure, however, is not limited to such an aspect. For example, it is allowable that the tank 400 is divided into three parts or portions, and that the divided three parts are connected, respectively, to four heads 11, four heads 11 and two heads 11. Further, the printing apparatus 1 of the above-described embodiment is provided with the three line head assemblies 10 and is configured to discharge the five color inks which are the white ink, cyan ink, magenta ink, yellow ink and black ink. The present disclosure is not limited to such an aspect; it is allowable that the printing apparatus 1 is configured to discharge an ink of an appropriate color. Further, in the embodiment, the UV-curable ink is used. The present disclosure, however, is not limited to such an aspect; it is allowable to use an ink different from the UV-curable ink (for example, a water-based ink, a pigment ink, etc.).

Further, the application of the present disclosure is not necessarily limited to the line head assembly including the line heads, and the present disclosure is widely applicable to a head assembly including a plurality of heads. Further, the application of the present disclosure is not limited to a printing apparatus of the ink-jet system which is configured to discharge or eject an ink. Further, the present disclosure is applicable also to a printing apparatus usable in a variety of kinds of application which are different from printing of an image, etc. For example, it is possible to apply the present disclosure to a printing apparatus configured to form a conductive pattern on a surface of a substrate by discharging a conductive liquid onto the substrate. The scope of the present disclosure is intended to encompass all the changes within the scope of the claims, and the scope equivalent to the scope of the claims.

What is claimed is:

1. A head assembly comprising:

a rigid substrate including a connector and on which a power source is mounted;

a plurality of heads;

a tank configured to store an ink which is to be supplied to the plurality of heads;

a plurality of tubes each fluidically connecting the tank and one of the plurality of heads;

a heater configured to warm the ink in the tank and in the plurality of tubes;

a plurality of flexible substrates each including an end electrically connected to one of the plurality of heads;

a relay substrate to which the other end of each of the plurality of flexible substrates are electrically connected, wherein the relay substrate includes a first connector electrically connected to the connector of the rigid substrate and wherein the connector of the rigid substrate is inserted into the first connector of the relay substrate so that the rigid substrate stands perpendicularly with respect to the relay substrate;

a first member defining a first space and including an airflow port configured to take an outside air thereinto; and a second member defining a second space which is arranged on one side in a first direction with respect to the first space, wherein the rigid substrate is arranged in the first space, wherein the first connector of the relay substrate is arranged in a first surface, of the relay substrate, defining the first space, wherein the tank, the heater, the plurality of tubes and the plurality of flexible substrates are arranged in the second space, and wherein the relay substrate is arranged between the first space and the second space in the first direction, and partitions the first space and the second space from each other.

2. The head assembly according to claim 1, and a plurality of second connectors each of which is electrically connected to the other end of one of the plurality of flexible substrates.

3. The head assembly according to claim 2, wherein the plurality of second connectors of the relay substrate are arranged in a second surface, of the relay substrate, defining the second space.

4. The head assembly according to claim 3, wherein an electric power input port is connected to the relay substrate, and wherein the electric power input port and an ink supply port through which the ink is supplied to the tank are arranged in a lateral surface of the second member.

5. The head assembly according to claim 4, wherein the electric power input port is arranged above the ink supply port in the lateral surface of the second member.

6. The head assembly according to claim 1, wherein a first opening is formed in a surface, of the first member, which faces the second member in the first direction, wherein a second opening is formed in a part of a surface, of the second member, which faces the first member in the first direction, the part overlapping with the first opening in the first direction, and wherein the relay substrate is arranged to close the first opening or the second opening.

7. The head assembly according to claim 6, wherein the relay substrate is arranged to close the second opening, and wherein the rigid substrate passes the first opening and extends in the first direction.

8. The head assembly according to claim 1, wherein the rigid substrate is one rigid substrate included in a plurality of rigid substrates, and wherein a number of the plurality of rigid substrates, a number of the plurality of heads, and a number of the plurality of flexible substrates are same to one another.

9. The head assembly according to claim 8, wherein each of the plurality of rigid substrates has a first surface having the power source mounted thereon, and a second surface having an element mounted thereon, a height in a normal direction, which is perpendicular to the first surface, of the element being lower than a height in the normal direction of the power source, wherein the plurality of rigid substrates are arranged in the first space so that the normal direction of each of the plurality of rigid substrates is orthogonal to the first direction, wherein the plurality of rigid substrates are arranged in the first space so as to form two rows each of which includes two or more rigid substrates, of the plurality of rigid substrates, arranged in a row direction orthogonal to the first direction and the normal direction, and wherein the second surface of each of the two or more rigid substrates included in one of the two rows and the second surface of each of the two or more rigid substrates included in the other of the two rows face each other in the normal direction.

10. The head assembly according to claim 9, wherein the first surface of each of the two or more rigid substrates included in the one of the two rows faces a first lateral surface of the first member in the normal direction, wherein the first surface of each of the two or more rigid substrates included in the other of the two rows faces a second lateral surface of the first member in the normal direction, and wherein a distance L1 between the first surface of each of the two or more rigid substrates included in the one of the two rows and the first lateral surface of the first member, and a distance L2 between the first surface of each of the two or more rigid substrates included in the other of the two rows and the second lateral surface of the first member are greater than a distance L3 between the second surface of a certain rigid substrate of the two or more rigid substrate included in the one of the two rows and the second surface of another rigid substrate of the two or more rigid substrate included in the other of the two rows, the certain rigid substrate and the another rigid substrate facing each other in the normal direction.

11. The head assembly according to claim 9, further comprising a fan, wherein the airflow port is arranged on a lateral surface, on one side in the row direction, of the first member, and wherein the fan is arranged in the first member at a position at which the fan is capable of feeding an airflow to the first space via the airflow port.

12. The head assembly according to claim 1, wherein the first member is a first casing, and wherein the second member is a second casing which is configured to be separable with respect to the first casing.

13. The head assembly according to claim 12, wherein the first direction is an up-down direction, and wherein the first casing is arranged above an upper surface of the second casing.

14. The head assembly according to claim 13, wherein the upper surface of the second casing includes:

a first top plate;

a second top plate arranged above the first top plate and on one side in a depth direction with respect to the first top plate, the depth direction being orthogonal to the up-down direction; and a connecting wall spreading in the up-down direction and a width direction orthogonal to the up-down direction and the depth direction so as to connect the first top plate and the second top plate in the up-down direction, the connecting wall being orthogonal to the depth direction, wherein the first casing includes a bottom surface, and a lateral surface which spreads in the up-down direction and the width direction and which is orthogonal to the depth direction, and wherein the first casing is arranged above the upper surface of the second casing so that the bottom surface of the first casing faces the first top plate of the second casing in the up-down direction, and that the lateral surface of the first casing faces the connecting wall of the second casing in the depth direction.

15. The head assembly according to claim 14, wherein the plurality of heads are arranged at a position, in the second casing, overlapping with the first top plate in the up-down direction, and wherein the plurality of heads are not arranged at a position, of the second casing, overlapping with the second top plate in the up-down direction.

16. The head assembly according to claim 14, wherein a first grip is arranged in an upper surface of the first casing, and wherein a second grip is arranged in a side wall, of the second casing, which spreads in the up-down direction and the width direction and which is orthogonal to the depth direction.

17. The head assembly according to claim 1, wherein the first member is configured to be open the first space upward; and the first space is arranged above the second space.

18. A printing apparatus comprising:

the head assembly as defined in claim 1; and a conveyor configured to convey a recording medium with respect to a conveyance surface facing a nozzle surface provided on each of the plurality of heads.

* * * * *